US012763622B2

(12) United States Patent
Hongo

(10) Patent No.: US 12,763,622 B2
(45) Date of Patent: Oct. 13, 2026

(54) COIL, STATOR, AND MOTOR

(71) Applicant: ASTER CO., LTD., Yokote (JP)

(72) Inventor: Takenobu Hongo, Fukushima (JP)

(73) Assignee: ASTER CO., LTD., Yokote (JP)

( * ) Notice: Subject to any disclaimer, the term of this patent is extended or adjusted under 35 U.S.C. 154(b) by 390 days.

(21) Appl. No.: 18/009,961

(22) PCT Filed: Aug. 18, 2021

(86) PCT No.: PCT/JP2021/030112
§ 371 (c)(1),
(2) Date: Dec. 12, 2022

(87) PCT Pub. No.: WO2022/097345
PCT Pub. Date: May 12, 2022

(65) Prior Publication Data

US 2023/0344291 A1 Oct. 26, 2023

(30) Foreign Application Priority Data

Nov. 9, 2020 (JP) ................................ 2020-186462

(51) Int. Cl.
*H02K 3/18* (2006.01)
*H02K 1/14* (2006.01)
*H02K 3/34* (2006.01)
*H02K 15/10* (2025.01)
*H02K 15/33* (2025.01)

(52) U.S. Cl.
CPC ............... *H02K 3/18* (2013.01); *H02K 1/146* (2013.01); *H02K 3/34* (2013.01); *H02K 15/105* (2013.01); *H02K 15/33* (2025.01)

(58) Field of Classification Search
CPC .. H02K 3/04; H02K 3/18; H02K 3/34; H02K 3/522
USPC ........................................................ 310/208
See application file for complete search history.

(56) References Cited

U.S. PATENT DOCUMENTS

| | | | | |
|---|---|---|---|---|
| 6,311,387 | B1 | 11/2001 | Shikama et al. | |
| 10,211,710 | B2 | 2/2019 | Hongo | |
| 10,742,097 | B2 | 8/2020 | Hongo | |
| 2003/0151315 | A1* | 8/2003 | Choi | H02K 7/14 310/58 |
| 2003/0164653 | A1 | 9/2003 | Yasuda | |

(Continued)

FOREIGN PATENT DOCUMENTS

| | | | |
|---|---|---|---|
| CN | 1437304 | A | 8/2003 |
| CN | 109274223 | A | 1/2019 |

(Continued)

OTHER PUBLICATIONS

JP-2015116607-A machine translation (Year: 2015).*

(Continued)

*Primary Examiner* — Oluseye Iwarere
*Assistant Examiner* — Minki Chang
(74) *Attorney, Agent, or Firm* — Morrison & Foerster LLP

(57) ABSTRACT

Provided are a coil capable of enhancing heat dissipation performance and/or voltage resistance, and a stator and a motor using the coil.
A coil includes a helical structure body made of strip-shaped flat conductors that are continuously joined into a helical form. In the helical structure body, a first turn of helix is separated from a second turn, which is continuous to the first turn, at a preset interval.

15 Claims, 18 Drawing Sheets

(56) References Cited

U.S. PATENT DOCUMENTS

| | | | | |
|---|---|---|---|---|
| 2007/0024132 | A1 | 2/2007 | Salamah | |
| 2014/0333409 | A1* | 11/2014 | Ono | H01F 5/06 336/223 |
| 2016/0315525 | A1 | 10/2016 | Hongo | |
| 2019/0006921 | A1 | 1/2019 | Hongo | |
| 2020/0051728 | A1* | 2/2020 | Matsumoto | H01F 17/0013 |
| 2020/0195075 | A1* | 6/2020 | Hishida | H02K 3/18 |
| 2020/0287446 | A1 | 9/2020 | Hongo | |
| 2021/0057151 | A1 | 2/2021 | Sasaki et al. | |
| 2022/0337135 | A1 | 10/2022 | Hongo | |
| 2022/0352792 | A1* | 11/2022 | Hongo | H02K 15/33 |

FOREIGN PATENT DOCUMENTS

| | | | |
|---|---|---|---|
| CN | 110521089 | A | 11/2019 |
| JP | H11-354364 | A | 12/1999 |
| JP | 2002-227841 | A | 8/2002 |
| JP | 5592554 | B1 | 9/2014 |
| JP | 2015116607 | A * | 6/2015 |
| JP | 2017-4897 | A | 1/2017 |
| JP | 2018-98380 | A | 6/2018 |
| JP | 2019-213324 | A | 12/2019 |
| JP | 2020-014298 | A | 1/2020 |
| JP | 2020-27820 | A | 2/2020 |
| JP | 2020-27840 | A | 2/2020 |

OTHER PUBLICATIONS

International Search Report and Written Opinion mailed Nov. 2, 2021, directed to International Application No. PCT/JP2021/030112; 16 pages.

Supplementary European Search Report dated Apr. 5, 2024, directed to EP Application No. 21888898.0; 4 pages.

First Office Action dated Jun. 16, 2026, directed to CN Application No. 202180042285.3; 20 pages.

* cited by examiner

10(10M)
61,11(11E)
61,11(11F)
61
61A
62
ST(ET)
CR
C
P
G'
β

COIL, STATOR, AND MOTOR

CROSS-REFERENCE TO RELATED APPLICATIONS

This application is a U.S. national stage application under 35 U.S.C. § 371 of International Application No. PCT/JP2021/030112, filed Aug. 18, 2021, which claims the priority of Japanese Application No. 2020-186462, filed Nov. 9, 2020, the entire contents of each priority application is incorporated herein by reference.

FIELD OF THE DISCLOSURE

The present invention relates to a coil having a spiral structure configured by pressurizing and deforming a flat plate, and a stator and a motor using the coil.

BACKGROUND OF THE DISCLOSURE

A stator, which is a component member of a motor, has a coil provided around a core (stator core). To achieve a low loss and smaller motor, it is important to enhance the space factor of the coil in the core.

A coil with an enhanced space factor in the core and a manufacturing apparatus thereof have been known (see, for example, Patent Literature 1). The coil is formed by preparing flat conductors punched into a U shape (a shape of Japanese katakana “ko”), welding the end faces of the flat conductors to each other through cold pressure welding to form a region for one turn of the coil, and continuously joining the formed regions for one turn into a helical form.

According to the technique described in Patent Literature 1, it is possible to provide a good-quality coil which has an enhanced space factor in a core and enhanced heat dissipation performance and which is free from deterioration in properties in welded portions even though the coil has a helical structure formed by welding (joining) the flat conductors.

Patent Literature 1: Japanese Patent No. 5592554

SUMMARY OF THE DISCLOSURE

However, particularly in the case of coils used for, for example, motors serving as a motive power source in electric vehicles and the like, high heat dissipation performance and/or high voltage resistance are required. In this regard, there is room for further improvement.

It is an object of the present invention to provide a coil capable of enhancing heat dissipation performance and/or voltage resistance, and a stator and a motor using the coil.

The present invention solves the above-described problem by a following means.

The present invention relates to a coil including a helical structure body made of strip-shaped flat conductors that are continuously joined into a helical form. In the helical structure body in a completed state, a first turn of helix is separated from a second turn, which is continuous to the first turn, at an interval preset to fulfill a prescribed function.

The present invention also relates to a coil including a helical structure body of a conductor. Each turn of the helical structure body is covered with an injection-molded resin.

The present invention also relates to a stator including the above-mentioned coil and a stator member having teeth arranged in an annular shape. The coil is directly attached to each of the teeth.

The present invention also relates to a motor including the above-mentioned stator.

The present invention can provide a coil capable of enhancing heat dissipation performance and/or voltage resistance, and a stator and a motor using the coil.

BRIEF DESCRIPTION OF THE FIGURES

FIGS. 1A-1C include diagrams showing appearance of a coil manufactured by a method for manufacturing a coil according to an embodiment of the present invention, in which FIG. 1A is a plan view of the coil, and FIGS. 1B and 1C are side views thereof.

FIGS. 2A-2G include diagrams illustrating a coil piece according to the present embodiment, in which FIG. 2A is a plan view of the coil piece, FIGS. 2B and 2C are cross-sectional views thereof, and FIGS. 2D-2G are plan views thereof.

FIGS. 9A-9C include schematic views of the coil for illustrating the method for manufacturing a coil according to the present embodiment, in which FIG. 9A is a plan view of the coil, FIG. 9B is a cross-sectional view thereof, and FIG. 9C is a side view thereof.

FIGS. 12A-12H include diagrams illustrating the coil according to the present embodiment, in which FIG. 12A is a schematic side view of the coil, FIG. 12B is an external perspective view thereof, FIGS. 12C and 12D are side views thereof, and FIGS. 12E-12H are schematic side views thereof.

FIGS. 13A-13D include diagrams illustrating the coil according to the present embodiment, in which FIG. 13A is a schematic side view of the coil, FIG. 13B is an external perspective view thereof, FIGS. 13C and 13D are schematic side views thereof.

FIGS. 15A-15G include diagrams illustrating the coil according to the present embodiment, in which FIG. 15A is a schematic cross-sectional view of the coil, FIG. 15B is an external perspective view thereof, FIG. 15C is a schematic cross-sectional view thereof, FIG. 15D is a schematic side view thereof, FIGS. 15E and 15F are schematic cross-sectional views thereof, and FIG. 15G is a schematic side view thereof.

FIGS. 16A-16E include diagrams illustrating a stator according to the present embodiment, in which FIG. 16A is a plan view of the stator, and FIGS. 16B-16E are schematic plan views thereof, showing extracted parts of the stator.

FIGS. 17A-17D include diagrams illustrating a motor according to the present embodiment, in which FIGS. 17A-17C are external perspective views of the motor, and FIG. 17D is a transparent side view thereof.

FIGS. 18A and 18B include diagrams illustrating another example of the motor according to the present embodiment, in which FIG. 18A is a schematic cross-sectional view of the motor and FIG. 18B is a perspective view thereof.

DETAILED DESCRIPTION OF THE DISCLOSURE

Hereinafter, embodiments of the present invention will be described in details with reference to the drawings.

First, a coil 10 according to the present invention will be described.

Figure 1A:
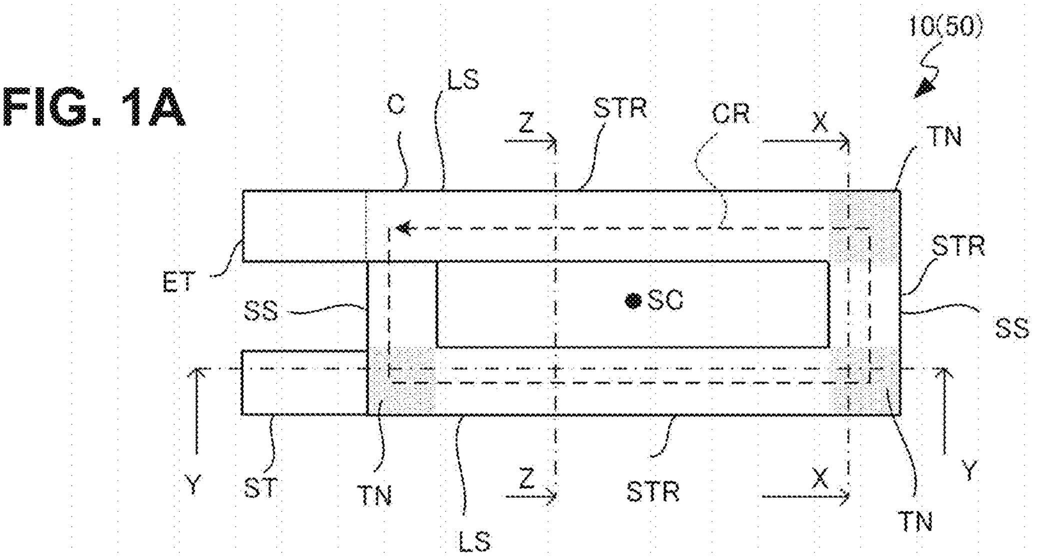
Figure 1B:
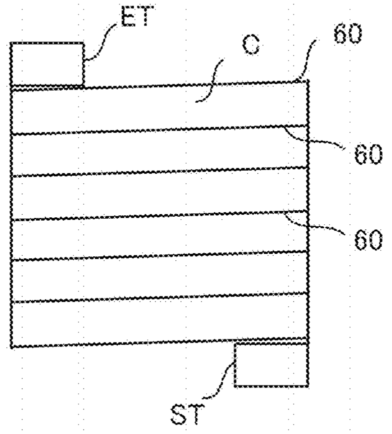
Figure 1C:
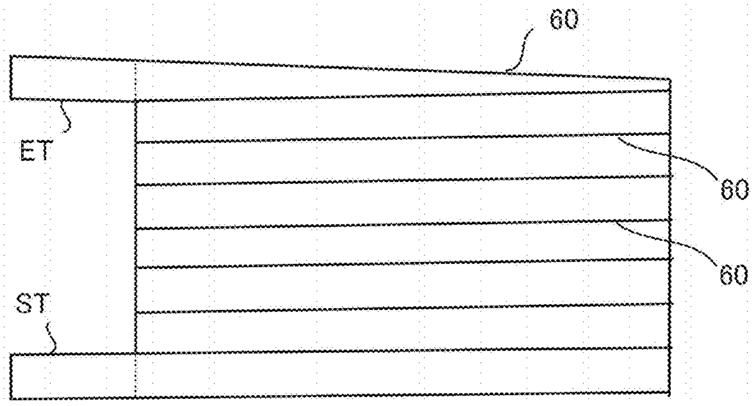

FIGS. 1A-1C include appearance views illustrating the outline of the coil 10 according to the present embodiment, in which FIG. 1A is a plan view of the coil 10 in a helical structure as viewed from a helical axis direction, FIG. 1B is a side view as viewed from the direction of a shorter side SS of the helical structure (for example, the left side in FIG. 1A), and FIG. 1C is a side view as viewed from the direction of a longer side LS of the helical structure (for example, a lower side in FIG. 1A).

In FIGS. 1A-1C and subsequent drawings, some of the configurations will be omitted as appropriate to simplify the drawings.

In FIGS. 1A-1C and subsequent drawings, the size, shape, thickness, etc. of members will be expressed in an exaggerated manner as appropriate.

As shown in FIGS. 1A-1C, the coil 10 of the present embodiment has a helical structure formed with flat conductors (coil pieces C). In one example, the coil 10 is attached to a stator that constitutes a motor. More specifically, the coil 10 is a so-called concentrated winding coil that is wound so that each turn constituting the helical structure has an axial center SC that is substantially identical (each turn is substantially overlapped in a helical axis direction of the coil 10).

The coil 10 is also an edgewise coil formed by continuously connecting a plurality of strip-shaped flat conductors (coil pieces) C, each having a straight portion (straight portion STR), into a helical structure body 50 (configured as wound flat conductors C when completed).

As shown in FIG. 1A, a region for one turn of the helical structure body 50 (a region indicated by a large dashed arrow in FIG. 1A, which is hereinafter referred to as a region CR for one turn) has winding corner portions TN in a substantially rectangular shape. At least an inner peripheral side of the helical structure body 50 (both the inner peripheral side and the outer peripheral side in FIG. 1A) are (substantially) rectangular in a plan view as viewed from the axis direction of the helical structure body 50. The flat conductors C constituting the coil 10 are also referred to as coil pieces C in the following description.

Although not shown in detail, the coil 10 is configured so that an insulating resin 60 is applied to the periphery of the flat conductors C with a helical structure. The insulating resin 60 is continuously provided from one end ST side to the other end ET side of the coil 10 along a helical traveling direction. The regions CR for one turn of the helical structure body 50 are each insulated by the insulating resin 60. Note that the ends (the one end ST and the other end ET) of the coil 10 are connection portions (terminals) with other members, and may not be provided with the insulating resin 60.

Figures 2A, 2B, 2C, 2D, 2E, 2F, 2G:
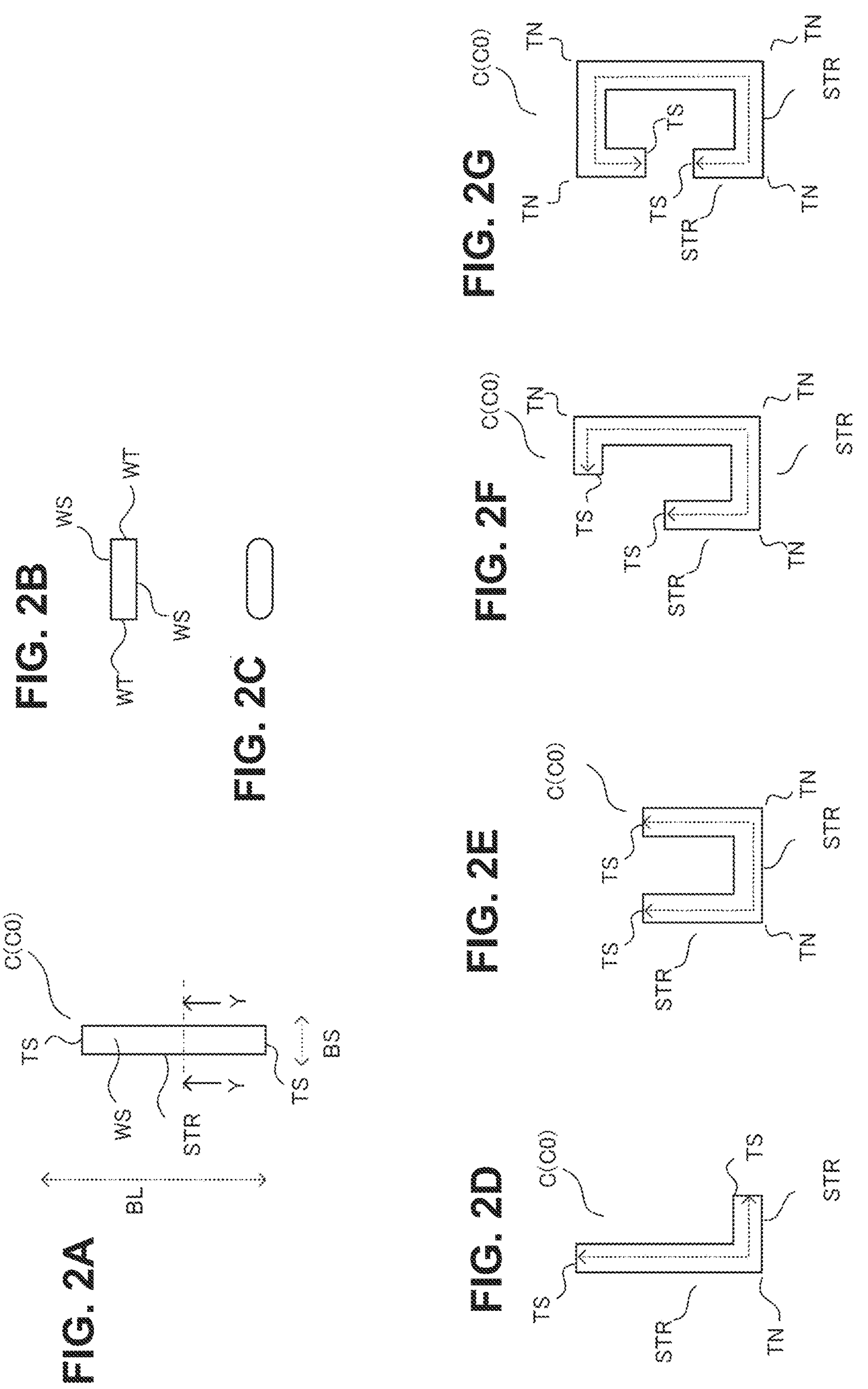

With reference to FIGS. 2A-2G, the flat conductors C constituting the coil 10 will be described. FIGS. 2A-2G include diagrams showing examples of the flat conductor C that constitutes the coil 10 of the present embodiment. FIG. 2A is a plan view (top view) of the flat conductor C. FIGS. 2B and 2C are enlarged cross-sectional views of FIG. 2A taken along line Y-Y. FIGS. 2D-2G are plan views (top views) showing examples of the shape of the flat conductor C.

The coil 10 is a series of strip-shaped flat conductors C connected in their straight portions STR along a strip longitudinal direction BL (helical traveling direction indicated by a dashed arrow line). More specifically, end faces TS of the flat conductors C in the strip longitudinal direction BL (helical traveling direction) shown in FIGS. 2A-2G are butted and pressed (pressure-welded, such as cold pressure-welded) against each other so as to be continuously joined to form the helical structure body 50 which has a desired number of turns.

As shown in FIGS. 2A-2C), the flat conductors (coil pieces) C of the present embodiment are strip-shaped (tape-shaped) conductors long in a prescribed direction, with two wider surfaces WS that face each other and two narrow surfaces WT that face each other. The conductors C also have a cross section (cross section taken along line Y-Y in FIG. 2A) orthogonal to the strip longitudinal direction BL, which is formed into a rectangular shape as shown in FIG. 2B or a rectangular shape with rounded corners as shown in FIG. 2C. In the following description, the flat conductors C which have a (substantially) rectangular shape in a cross section that is orthogonal to the strip longitudinal direction BL as shown in FIG. 2B will be used as an example.

Specifically, the flat conductors (coil pieces) C of the present embodiment can constitute the helical structure body 50 when the plurality of flat conductors C are continuously joined. Moreover, the region CR for one turn of the helical structure body 50 in the present embodiment is constituted of one or more coil pieces C.

In other words, the coil pieces C have a shape constituted of only the straight portion STR (FIG. 2A) or a shape which has at least one straight portion STR and at least one corner portion TN (FIGS. 2D-2G). Here, the corner portion TN is a portion (direction change portion) bent to alter an extending direction of the strip longitudinal direction BL.

In the case of the flat conductors (coil pieces) C which have the corner portions TN as shown in FIGS. 2D-2G, the respective corner portions TN are bent in an identical direction (consistently in the right or left direction) along the strip longitudinal direction BL so as to make a helical form when the flat conductors are continuously joined. In the case of the coil pieces C which have the corner portions TN, it is desirable for at least one (preferably all) of the corner portions TN to have a shape that is not a curve (for example, a substantially rectangular) shape.

In the following description, the coil pieces C also include a helical structure body 50 that is formed by continuously joining (connecting) the plurality of coil pieces (flat conductors) C but is not yet completed as the coil 10 which has a prescribed number of turns (a helical structure body 50 with additional coil pieces C yet to be connected thereto). In other words, in the following description, the coil pieces C include, as shown in FIGS. 2A-2G, a minimum unit coil piece (unconnected coil piece) which has a linear shape or which has the corner portions TN that are bent in an identical direction along the strip longitudinal direction BL, a coil piece that is formed by connecting a plurality of minimum unit coil pieces C and that is shorter than the region CR for one turn of the coil 10 (the helical structure body 50), or a coil piece which has a helical structure longer than the region CR for one turn of the coil 10 (helical structure body 50). When it is necessary for these coil pieces to be distinguished for the convenience of description, the minimum unit coil piece is referred to as a unit coil piece C0 (C01, C02, C03 . . . C0N), a welded product of coil pieces C formed by connecting a plurality of unit coil pieces C0, that is, a welded product not yet completed as the coil 10 (the helical structure body 50 yet to be completed) is referred to as a welded coil piece CC (CC1, CC2, . . . , CCN), and the helical structure body 50 scheduled to be completed (in the completed state) with a prescribed number of turns is referred to as a coil 10.

In an example, the coil pieces C (unit coil pieces C0) are configured, by a punching process of a copper plate (for example, plate-like oxygen-free copper with a thickness of, for example, 0.1 mm to 5 mm (high purity copper containing no oxides and with a purity of 99.95% or more)) or the like, to have a linear shape or a shape which has a substantially rectangular (non-curved) direction change portion (corner portion) TN. More specifically, in a plan view (top view), the shapes of the unit coil pieces C0 include a linear shape (I shape) without any corner portion TN (FIG. 2A), an L shape which has one corner portion TN (FIG. 2D), a U shape (a shape of Japanese katakana "ko") which has two corner portions TN (FIG. 2E), a substantially C shape which has three corner portions TN (FIG. 2F), and a C shape (FIG. 2G) or a substantially O shape which has four corner portions TN. In the following description, the coil pieces C may be described to have a U shape, a (substantially) C shape, and a substantially O shape. In any case, the corner portions TN are all in a substantially rectangular shape. The plurality of coil pieces C for manufacturing the coil 10 may be in any one of the shapes in FIGS. 2A-2G (the plurality of coil pieces C are all in the same shape), or may be in any combination of the plurality of shapes shown in FIGS. 2A-2G.

Figure 3:
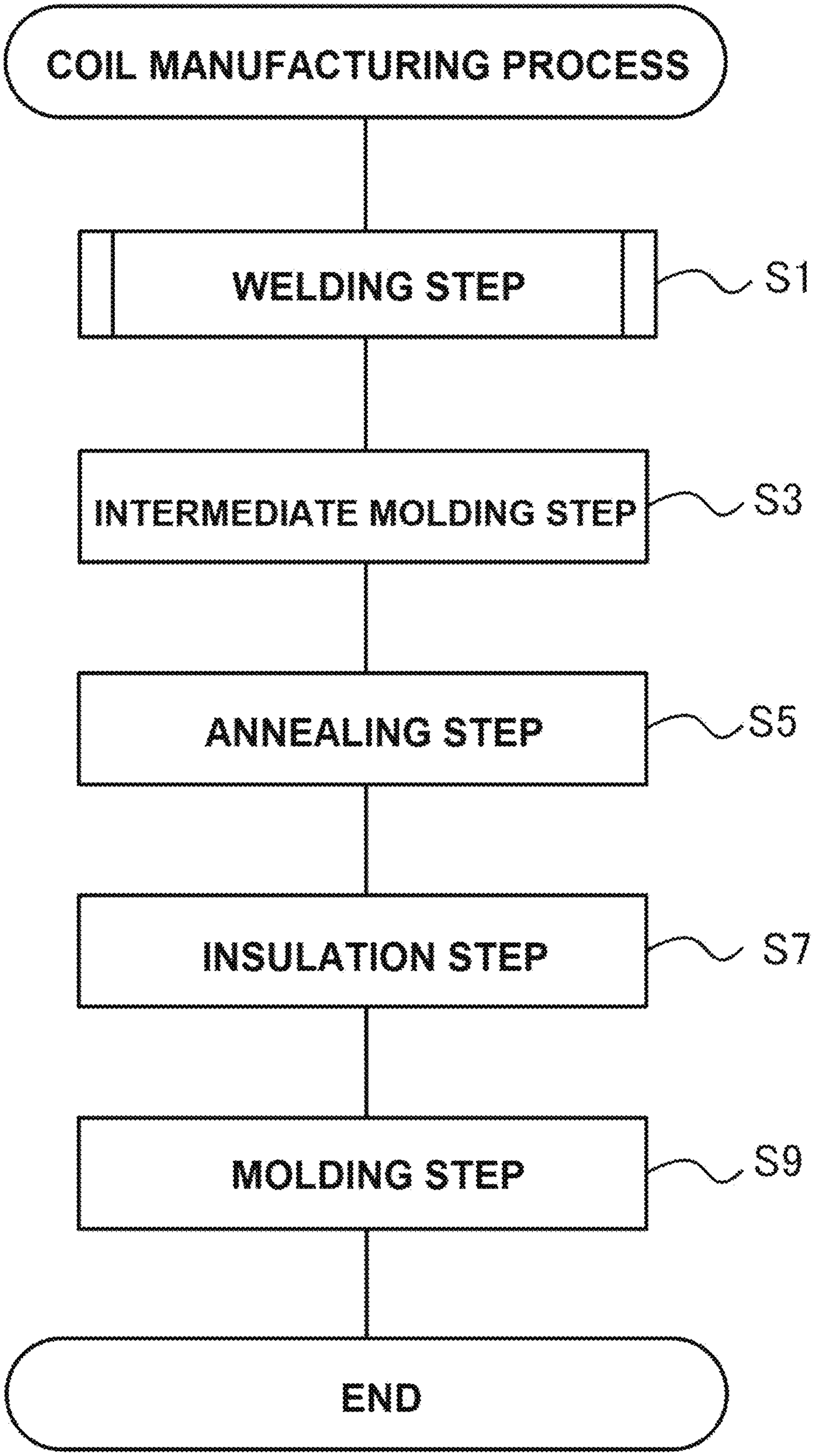
FIG. 3 is a flowchart illustrating a process flow in the method for manufacturing a coil according to the present embodiment.

FIG. 3 is a flowchart showing an example of the flow of a process (coil manufacturing process) related to the method for manufacturing a coil according to the present embodiment.

The method for manufacturing a coil includes, for example, a welding step, an intermediate molding step, an annealing step, an insulation step, and a molding step. In one example, the flow of the process (coil manufacturing process) by the method for manufacturing a coil according to the present embodiment is performed in order of the welding step (step S1), the intermediate molding step (step S3), the annealing step (step S5), the insulation step (step S7), and the molding step (step S9) as shown in FIG. 3. Hereinafter, the steps will be described in sequence.

First, the welding step shown in step S1 in FIG. 3 will be described. In the welding step, the helical structure body 50 is formed by preparing a plurality of strip-shaped flat conductors (coil pieces) C, which can constitute the helical structure body 50 when continuously joined, and butting and pressing one end face TS of one of the flat conductors C in the strip longitudinal direction BL and one end face TS of another one of the flat conductors C in the strip longitudinal direction BL.

Figure 4A:
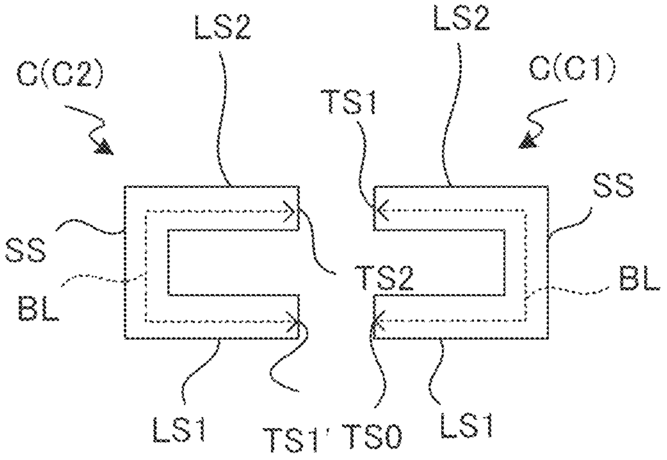
FIGS. 4A-4C include plan views illustrating the coil pieces according to the present embodiment.
Figure 4B:
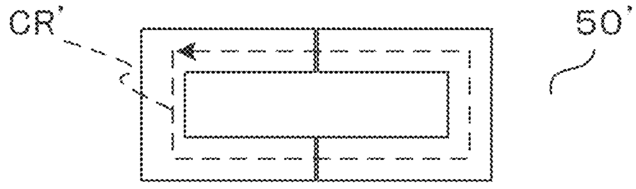
Figure 4C:
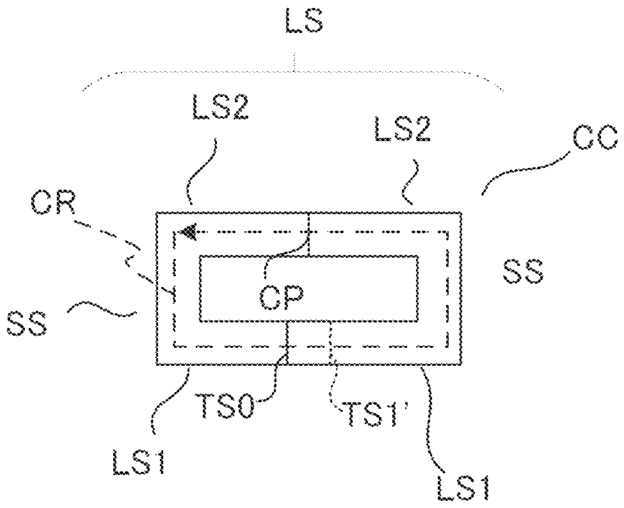

First, with reference to FIGS. 4A-4C, the coil pieces C to be prepared will be described. Here, as an example, the coil pieces C are in a U shape (in the shape of Japanese katakana "ko") as shown in FIG. 2E. FIGS. 4A and 4B are plan (top) views of two coil pieces C (C1, C2). FIG. 4C is a plan view showing a welded portion CP formed by pressure-welding one end faces TS of the respective coil pieces C in the welding step. Here, although the coil pieces C are represented by coil pieces C1 and C2 for the sake of convenience, they are coil pieces which have a (substantially) identical shape, and their front and back are reversed about end faces TS1 and TS2.

As shown in FIG. 4A, two coil pieces C (C1, C2) each have the end faces TS (TS0, TS1, TS1', TS2) in the strip longitudinal direction BL indicated by dashed arrows. As shown in FIG. 4B, the coil pieces C can form a helical structure body in a virtual state (hereinafter referred to as a "virtual helical structure body 50'") by abutting the end faces TS (the end face TS1 to the end face TS2, and the end face TS0 to the end face TS1') in the strip longitudinal direction BL. The virtual helical structure body 50' is set so that a length of a virtual region for one turn in the helical traveling direction indicated by a large dashed arrow line in FIG. 4B (hereinafter referred to as a "virtual region CR' for one turn") is longer, by a pressing amount for pressure welding, than a length of the region CR for one turn (indicated by the large dashed arrow line) of the welded coil piece CC (same as the coil 10 and the helical structure body 50) formed by welding two coil pieces C shown in FIG. 4C.

Specifically, with reference to FIG. 4A, the virtual region CR' for one turn (FIG. 4B) formed by abutting the end face TS1 of the coil piece C1 and the end face TS2 of the coil piece C2 are set to be longer, by the pressing amount for pressure welding, than the region CR for one turn (FIG. 4C) of the welded coil piece CC formed by pressure welding the end faces TS1 and TS2. Specifically, a preparation length that is a total distance obtained by totaling the distances of the respective coil pieces C in the strip longitudinal direction BL is set to be longer by a margin than a completion length of the coil 10 in a helical longitudinal direction. The margin is set to a total reduction distance that is a distance reduced by pressing when all the coil pieces C are cold pressure-welded.

Figure 5:
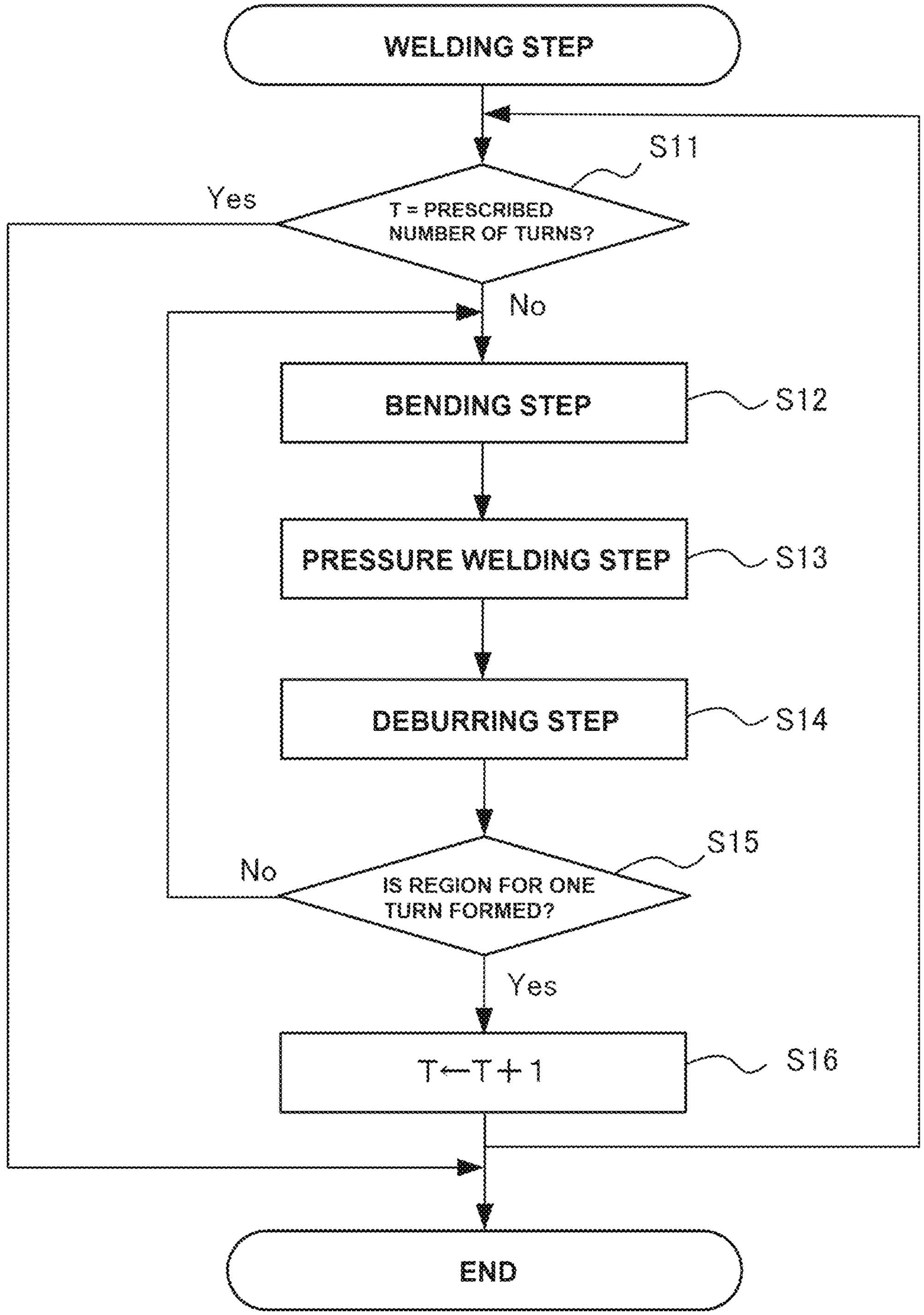
FIG. 5 is a flowchart showing a process flow of a welding step according to the present embodiment.

FIG. 5 is a flowchart showing an example of a process flow of the welding step shown in step S1 in FIG. 3. More specifically, the welding step includes, for example, a bending step (step S12), a pressure welding step (step S13), and a deburring step (step S14).

In the welding step, it is first determined whether the number of turns is a prescribed number of turns T (the number of turns T of the completed coil 10) (step S11). When the prescribed number of turns T is reached, the process is terminated. Otherwise, the bending step is performed (step S12). After the bending step, the pressure welding step is performed (step S13), followed by the deburring step (step S14). After the deburring step, it is determined whether or not the region CR for one turn is completed (step S15). When the region CR for one turn is not completed, the bending step of a next coil piece C is performed (step S12). When the region CR for one turn is completed, the number of turns T (step S16) is incremented, and the process returns to determination of the number of turns T (step S11).

Here, whether or not the region CR for one turn is completed (step S15) is determined, for example, on the basis of the number of coil pieces C to be processed. For example, in the case where the coil pieces C of the identical shape are welded to form the helical structure body 50 as shown in FIGS. 4A-4C, the number of coil pieces C that constitute the region CR for one turn is identified (in this example, the region CR for one turn is completed by two coil pieces C). Therefore, monitoring the number of coil pieces C to be processed makes it possible to determine the region CR for one turn. In addition to the above-mentioned case, the region CR for one turn may also be determined on the basis of, for example, appearance (or weight, etc.) of the coil pieces C (welded coil piece CC) after the pressure welding step, by the acquisition of images, etc.

Hereinafter, major steps are further described also with reference to FIGS. 6A-6K. FIGS. 6A-6K include side views of coil pieces C (welded coil piece CC) (as viewed from the left or right side in FIG. 2E).

Figure 6A:
FIGS. 6A-6K include schematic side views of the coil pieces for illustrating a method for manufacturing a coil according to the present embodiment.
Figure 6B:
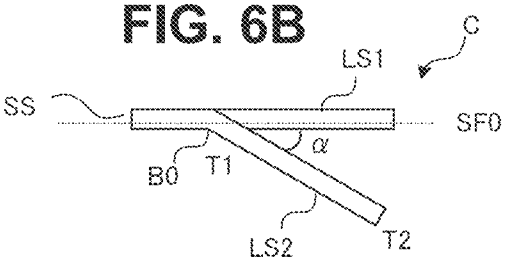

In the bending step (step S12 in FIG. 5), a bent portion B0 is formed for each of the coil pieces C by bending the coil pieces C so that a portion along a helical traveling direction inclines with respect to the remaining portion. The bending step is performed before the pressure welding of the coil pieces C. FIG. 6A is a side view of the coil piece C before deformation, and FIG. 6B is the coil piece C after the bent portion B0 is formed.

As shown in FIG. 6A, the coil piece C before deformation is a plate-shaped coil piece C punched from a plate as it is, and thus the entire region of the coil piece C is present in a substantially identical plane without being intentionally deformed. Here, the coil pieces C (C1, C2), which constitute the region CR for one turn corresponding to the first turn of the helical structure body 50, are unit coil pieces C0 (C01, C02).

In the bending step, each of the coil pieces C (C1, C2) is bent (subjected to bending processing) before welding (pressure welding), so that one side (for example, a longer side region LS2), out of two facing sides (for example, longer side regions LS1 and LS2 constituting a longer side LS as shown in FIGS. 4A and 4C) scheduled to constitute a region CR for one turn of the helical structure body 50, is inclined with respect to the other side (for example, the longer side region LS1). Thus, the bent portion B0 is formed as shown in FIG. 6B. In this example, the coil pieces C1 and C2 are identical in shape, and so the formation aspects of the bent portions B0 (position, bending angle α, etc.) are also identical.

More specifically, in the case where, for example, one longer side region LS1 and a shorter side SS of a coil piece C are positioned in a substantially identical plane (hereinafter referred to as a reference plane SF0), and the reference plane SF0 is maintained horizontally, the other longer side region LS2 is bent so as to be inclined with respect to the reference plane SF0 with the bent portion B0 as a boundary. The coil piece C is bent at the position of the bent portion B0 so that the other longer side region LS2 is positioned in such a manner that an another end portion T2 (that is on the side departing away from the shorter side SS), rather than an end portion T1 closer to the shorter side SS, is below (or above) the reference plane SF0, i.e., the reference plane SF0 (one longer side region LS1) and the other longer side region LS2 form an angle α.

Thus, in the bending step in the present embodiment, the coil pieces C1 and C2 are bent so that one side, out of two facing sides on the longer side of the coil pieces C1 and C2 (longer side regions LS1, LS2), which are scheduled to constitute a region CR for one turn of the coil 10, is inclined with respect to the other side.

One longer side region LS1 and the other longer side region LS2 in the above-mentioned example are different in name only for the convenience of description. In other words, the longer side regions LS1 and LS2 can be exchanged. In that case, the bent portion B0 can be deformed so that one longer side region LS1 and the other longer side region LS2 form a generally prescribed angle α.

Figure 6C:
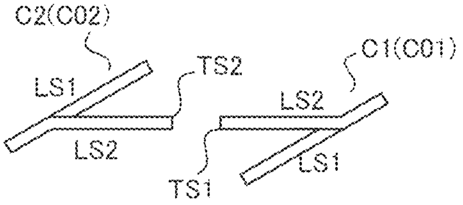
Figure 6D:
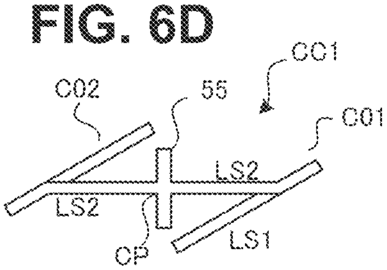

In the pressure welding step (step S13 in FIG. 5), as shown in FIG. 6C, one end face TS1 of the bent coil piece C1 (unit coil piece C01) and one end face TS2 of the bent coil piece C2 (unit coil piece C02) are pressed along the strip longitudinal direction BL, and connected (cold-pressure welded) to form a welded coil piece CC1 (FIG. 6D). FIG. 4C is a plan (top) view of the welded coil piece CC1 corresponding to a region CR for one turn welded in this manner. The coil 10 is formed by continuously joining a predetermined number of the regions CR for one turn. Accordingly, in FIG. 4C, the other end face TS0 is not welded to the other end face TS1', and therefore the region CR for one turn in this state is discontinuous in, for example, an opposite position of the welded portion CP.

In the pressure welding step, the end faces TS1 and TS2 are joined and pressed in the straight portions of the respective unit coil piece C01 and unit coil piece C02, while the distance in the strip longitudinal direction BL is reduced (see FIGS. 4B and 4C). As described before, the virtual helical structure body 50', formed of the plurality of coil pieces C (unit coil pieces C0), is set so that the virtual region CR' for one turn is longer, by the pressure amount for welding, than the region CR for one turn. In the pressure welding step, the coil pieces C are pressed against each other, so that the length of the virtual region CR' for one turn is made identical to the length of the region CR for one turn of the helical structure body 50.

In this example, in the longer side region LS2 of the unit coil piece C01 (coil piece C1) and the longer side region LS2 of the unit coil piece C02 (coil piece C2), the end faces TS1 and TS2 are pressed against each other. However, depending on the shape of the coil pieces C, the end faces TS may be pressed against each other on the shorter side SS.

Here, regarding formation of one welded portion CP, it is possible to perform cold pressure welding of the coil pieces C by one pressing session, or to perform cold pressure welding by repeating pressing sessions a number of times. Repeating pressing sessions can stabilize a welded surface. For example, regarding the cold pressure welding of one welded portion CP, the pressing time in one pressing session is shortened (for example, 5 seconds or shorter), the number of pressing sessions is increased (for example, about three to ten), and an interval of pressing (an interval between an Nth pressing session and an N+1st pressing session) is also shortened to the extent that the welded region is not oxidized.

More specifically, in the pressure welding step, a pressing-in amount (compression amount) in one pressing session is about 0.5 mm for each of the coil piece C1 and the coil piece C2. For example, the pressing session of about 5 seconds or less is repeated three to ten times for one welded portion CP so as to compress the welded portion CP by about 1 mm or more (preferably 1.5 mm or more, and specifically about 2 mm). With such an operation, the stable welded surface is obtained.

As shown in FIG. 6D, after cold pressure welding of two coil pieces C1 and C2 (after the welded coil piece CC1 is formed), burrs 55 are generated in the welded portion CP due to extrusion. With the burrs 55 remaining, they may interfere with a pressure welding device or the like during the next pressure welding. In the deburring step (step S14 in FIG. 5), the burrs 55 are removed.

Figure 6E:
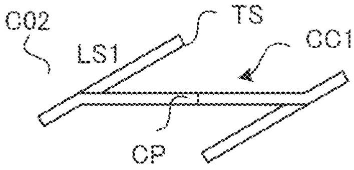

The burrs 55 are generated in a vertical up-down direction so as to be substantially orthogonal to a wider surface WS of the welded coil piece CC1 in the welded portion CP. The burrs 55 are removed by, for example, cutting with a cutting means such as scissors, or by scraping (grinding, polishing) with saw blades, blasting, etc. After removal of the burrs 55, a surface finish process such as polishing may also be performed. In addition, the burrs 55 may be removed by partial dissolution. The burrs 55, generated in the vertical up-down direction so as to be substantially orthogonal to the wider surface WS of the welded coil piece CC1, may all be removed by one deburring step, or, for example, the burrs 55 on the upper side and the burrs 55 on the lower side may be removed separately multiple times. In this way, a welded coil piece CC1 with the burrs 55 removed is obtained (FIG. 6E).

Figure 6F:
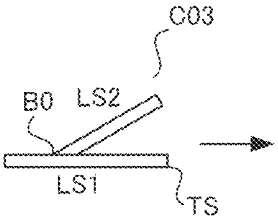
Figure 6G:
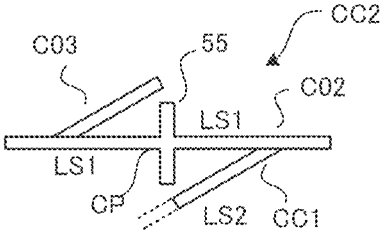
Figure 6H:
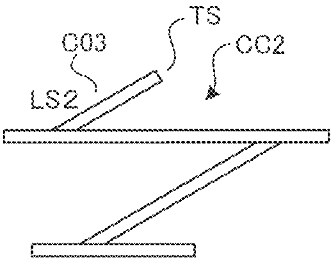
Figure 6I:
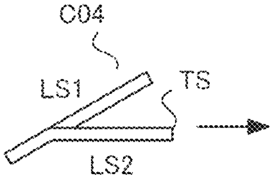

In the present embodiment, whenever one welded portion CP is formed, the burrs 55 are removed. The welded coil piece CC1 after removal of the burrs 55 (FIG. 6E) is pressure-welded to a new coil piece C (a coil piece C03 to be newly joined). Specifically, the bending step (step S12 in FIG. 5) is performed for the new unit coil piece C03 to form a bent portion B0 (FIG. 6F). Then, as shown in FIG. 6G, the new unit coil piece C03 and the welded coil piece CC1 with the burrs 55 removed are pressure-welded to form a new welded coil piece CC2. In this example, the end face TS of the longer side region LS1 of the unit coil piece C03 is pressure-welded to the end face TS of the longer side region LS1 of the welded coil piece CC1 on the side of the previous unit coil piece C02, for example. Then, burrs 55 generated in the new welded portion CP are removed (FIG. 6H).

Figure 6J:
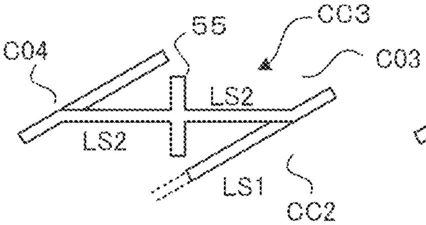
Figure 6K:
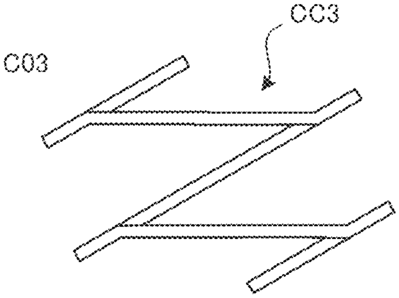

Furthermore, the bending processing is performed for another new coil piece C (a unit coil piece C04 to be newly joined) (FIG. 6I), and the unit coil piece C04 and the welded coil piece CC2 are pressure-welded (FIG. 6J). In this example, the end face TS of the longer side region LS2 of the unit coil piece C04 is pressure-welded to the end face TS of the longer side region LS2 of the welded coil piece CC2 on the side of the previous unit coil piece C03, for example. Then, burrs 55 are removed to obtain a welded coil piece CC3 (FIG. 6K).

Thereafter, the steps of bending a new coil piece C (unit coil piece C0N to be newly joined), pressure-welding the unit coil piece C0N and a welded coil piece CCN-1, and removing burrs 55 to form a welded coil piece CCN, are repeated to obtain the helical structure body 50 with a prescribed number of turns.

The configuration of the bent portion B0 (formation position, angle α of the bent portion B0, etc.) is appropriately selected in accordance with the shape of the coil piece C, the configuration of the pressure-welding device, the amount of pressure welding (pressing amount) of the coil piece C, etc.

Figure 7A:
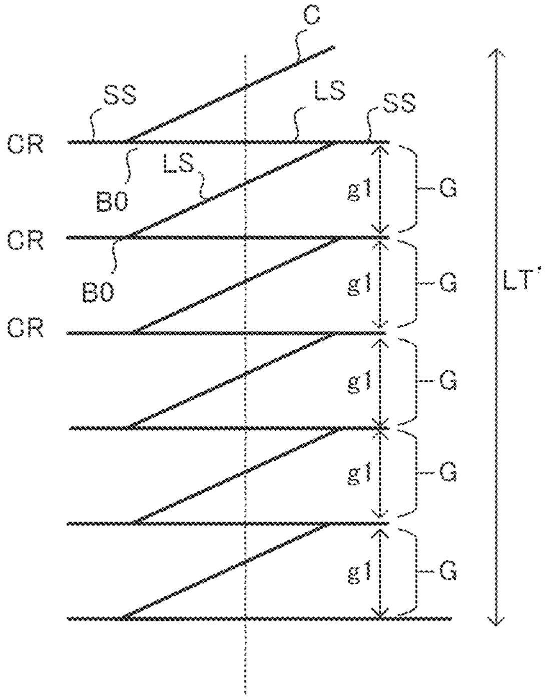
FIGS. 7A-7D include schematic side views of a helical structure body for illustrating the method for manufacturing a coil according to the present embodiment.
Figure 7B:
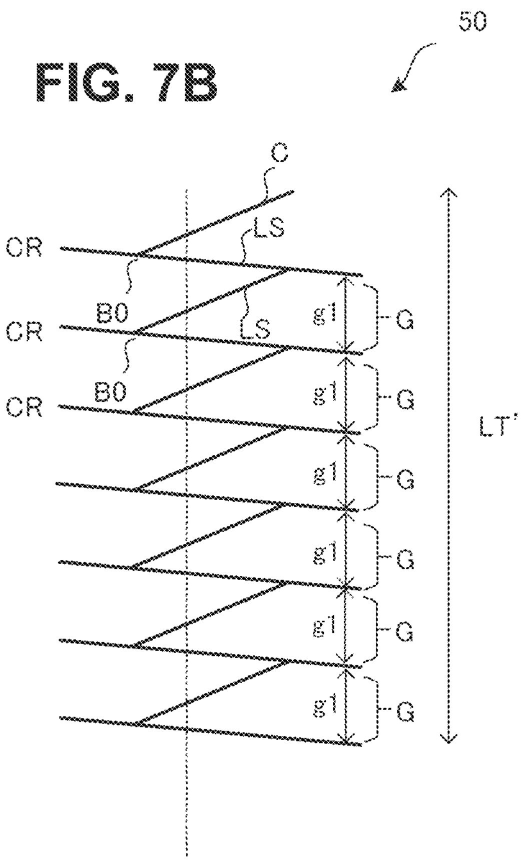
Figure 7C:
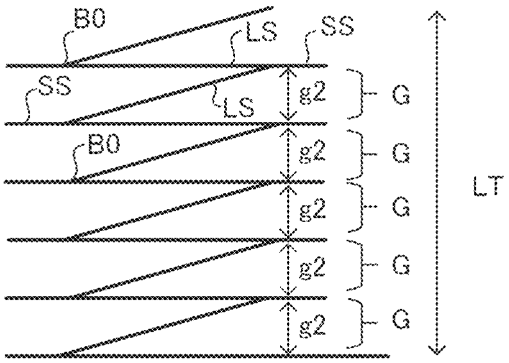
Figure 7D:
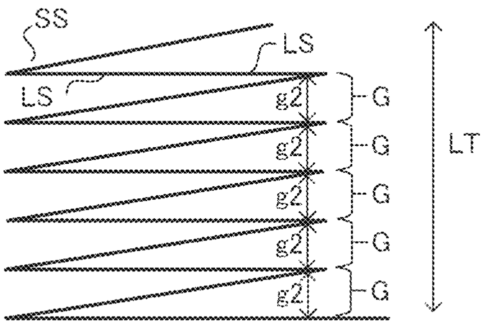

The intermediate molding step shown in step S3 in FIG. 3 will be described next. FIGS. 7A-7D include schematic side views showing the helical structure body 50 formed by pressure welding the coil pieces C corresponding to a prescribed number of turns. FIGS. 7A and 7B show the helical structure body 50 immediately after completion of all the pressure welding steps. FIGS. 7C and 7D show the helical structure body 50 after the intermediate molding.

The helical structure body 50 immediately after the end of the pressure welding steps has a shape as shown in FIG. 7A, that is, for example, the shape in which one longer side LS, out of the opposing longer sides LS, is substantially perpendicular to a helical axis (indicated by a dashed line). Without being limited to the shape shown in FIG. 7A, the shape of the helical structure body 50 may have a shape in which both the opposing longer sides LS are inclined with respect to the helical axis as shown in FIG. 7B.

As shown in FIGS. 7A and 7B, each coil piece C has a bent portion B0 to avoid interference with the pressure welding device. Immediately after the end of the pressure welding step, there is a large gap G (of approximately a distance g1) between each of the regions CR for one turn and the next. The distance g1 of each gap G herein is not intentionally (purposefully) ensured, but this means that a gap G with a certain distance is optionally generated immediately after the end of the pressure welding step. That is, the distances g1 between the regions CR for one turn are not exactly equal to one another. The distance g1 is altered as it is extended or shortened due to distortion at the time of machining or due to the own weight of the helical structure body 50.

In the intermediate molding step, in order to reduce the distance g1 of the gap G more than that in a state immediately after the end of the pressure welding step, the helical structure body 50 is deformed (elastically deformed and/or plastically deformed) in the helical axis direction to be compressed as a whole. The intermediate molding step reduces the gap G between each of the regions CR for one turn and the next to approximately a distance g2 (<g1) (FIGS. 7C and 7D). In the intermediate molding step, the distance g1 may be shortened to the distance g2 with the bent portion B0 remaining as shown in FIG. 7C, or the distance g1 may be shortened to the distance g2 while the helical structure body 50 is deformed so that the bent portion B0 returns to a (substantially) flat surface (the bent portion is eliminated) as shown in FIG. 7D. The distance g2 means that a gap G with a certain distance is generated by compressing the gap G with the distance g1. Moreover, since a final molding step is performed later, the distances g2 between the regions CR for one turn may not be exactly equal to one another. The distance g2 is a distance that appropriately separates the respective regions CR for one turn without causing close contact therebetween. The distance that appropriately separates is a distance that can sufficiently insulate each region CR for one turn in the later insulation step.

The intermediate molding shortens a length LT' in the helical axis direction of the helical structure body 50 to the length LT. In short, the intermediate molding step performs molding that reduces the a length LT' in the helical axis direction of the helical structure body 50 while ensuring the gap G with the distance g2.

The annealing step shown in step S5 in FIG. 3 will be described next. The helical structure body 50, which is made of a metal material (for example, a copper plate), experiences internal distortion and residual stress due to work hardening in the bending step, the pressure welding step, or the like, of the coil pieces C. Accordingly, annealing is performed to remove these distortions and residual stresses and soften the structure in order to improve workability. As an example, the plurality of helical structure bodies 50 is input into a heat treatment furnace (continuous annealing furnace) and heated to appropriate temperatures (e.g., a recrystallization temperature or higher) in an oxygen-free atmosphere (with an inert gas introduced, as necessary). The helical structure bodies 50 are held for a prescribed time, and are slowly cooled in the furnace. With the annealing, the metal material constituting the helical structure bodies 50 is altered into a structure without internal stress, and softens. The annealing also makes the helical structure bodies 50 susceptible to plastic deformation. It can also be said that annealing is performed to control the plasticity coefficient of the helical structure bodies 50 (to lower the elastic limit of the helical structure bodies 50). Although (the metal materials of) the helical structure bodies 50 soften after annealing, the shape is maintained unless external force is applied to the helical structure bodies 50.

As already described, in the pressure welding step, the gap G of the regions CR for one turn of the helical structure body 50 is sufficiently ensured (at distance g1) in order to perform pressure welding well. However, the intermediate molding step reduces the gap G to the distance g2 and shortens the length helical axis direction of the helical structure body 50 (length LT). This can reduce the occupancy area of the respective helical structure bodies 50 in the furnace during the annealing step, and increase the number of helical structure bodies 50 that can be accommodated in the furnace.

Figure 8:
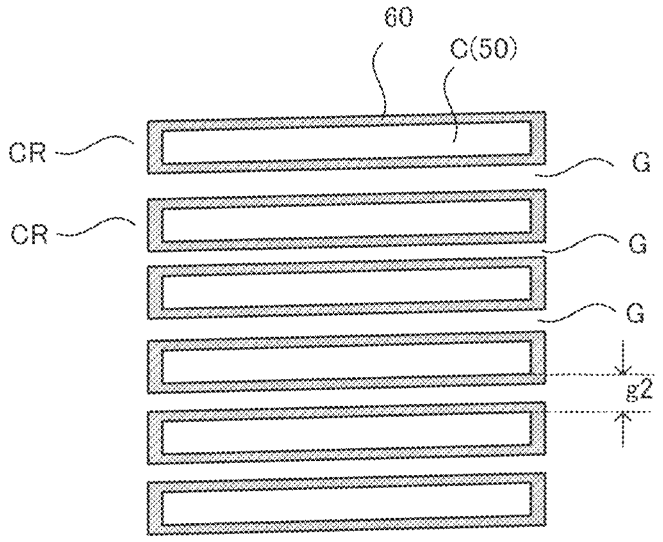
FIG. 8 is a schematic cross-sectional view of the helical structure body for illustrating the method for manufacturing a coil according to the present embodiment.

The insulation step in S7 shown in FIG. 3 will be described next. In the insulation step, the plurality of regions CR for one turn, which are overlapped in the helical structure body 50, are insulated from each other. FIG. 8 is a cross-sectional view taken along line X-X in FIG. 1A to show the outline of the helical structure body 50 after the end of the insulation step.

As an example, the insulation step is performed by coating each of the regions CR for one turn with an insulating resin 60. Specifically, the helical structure body 50 is immersed in a solution containing, for example, an insulating resin, and is coated with the insulating resin 60 by electrodeposition, for example. The helical structure body 50 is formed with the gaps G (with the distance g2), so that the insulating resin 60 also enters the gap G between each of the regions CR for one turn and the next. As a result, the periphery of the flat conductors, formed by continuously joining the coil pieces C from one end side to the other end side along the helical traveling direction, is continuously covered with the insulating resin 60. Hence, as shown in FIG. 8, the regions CR for one turn overlapped in the helical structure body 50 are insulated from each other.

In short, in the intermediate molding step in step S3, the distance g1 of the gap G is shortened to the distance g2. In the insulation step, however, the distance g2 of the gap G is ensured so that the periphery of the respective regions CR for one turn is reliably insulated, and all the regions CR for one turn (helical structure body 50) corresponding to the number of turns are continuously insulated.

The helical structure body 50 may be coated with the insulating resin 60 not only by immersion but also by spraying it with a liquid insulating resin 60.

After the annealing step (in the softened state), the helical structure body 50 may be deformed into the shape necessary for the coating of the insulating resin 60 (for example, extension/reduction of the distance g2 of the gap G, etc.).

In the conventional art, a long round conducting wire (or a flat conductor) corresponding to the length of a completed coil is coated with an insulating resin, and then the round conducting wire is wound to form a helical structure. However, in that case, the insulating resin is stretched to reduce the coating thickness in the vicinity of the outer periphery of a wound curved portion, which results in deterioration of withstand voltage. In contrast, in the present embodiment, after the helical structure body 50 is formed, the insulation process is performed for the entire helical structure body 50 with the gap G present between each of the regions CR for one turn and the next. Therefore, it is possible to perform continuous and substantially uniform coating of the periphery of the flat conductors C, which constitute the helical structure body 50, with the insulating resin 60 from one end ST side to the other end ET side of the helical structure along the helical traveling direction. As a result, the uniformity of the film thickness of the insulating resin 60 can be enhanced.

Figure 9A:
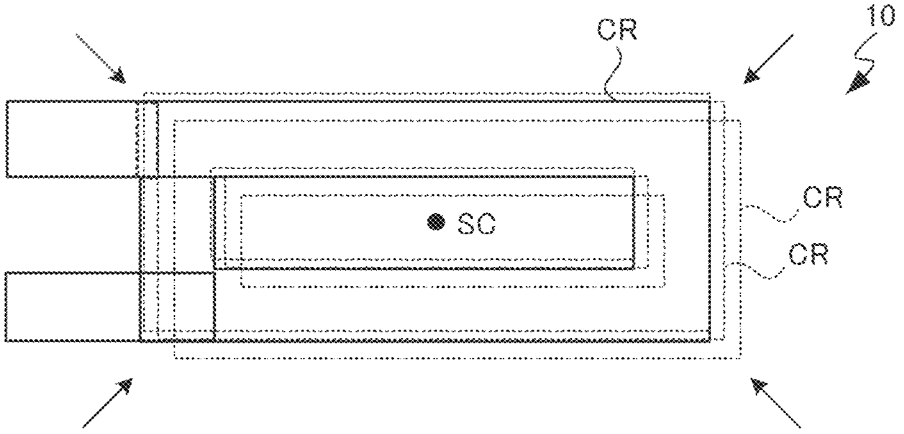
Figure 9B:
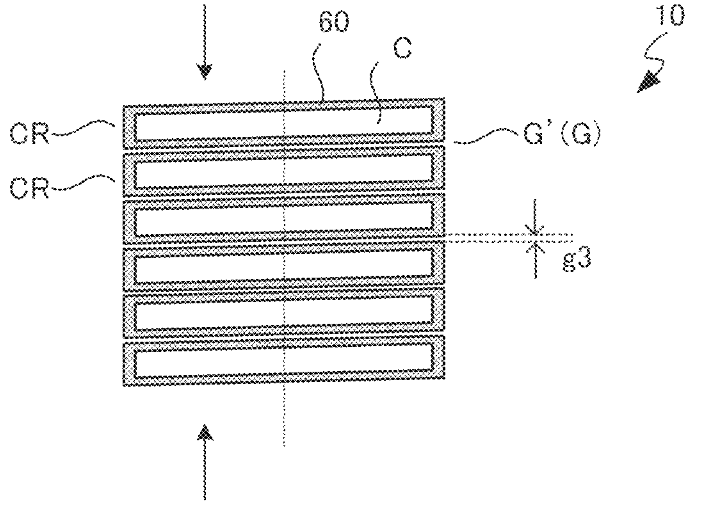
Figure 9C:
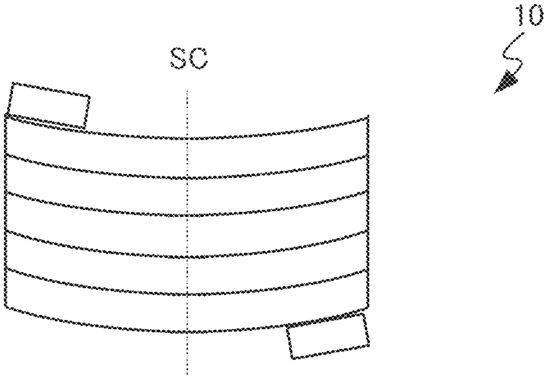

The molding step in step S9 shown in FIG. 3 will be described next. FIG. 9A is a plan view showing the appearance of the helical structure body 50 immediately after the end of the insulation step (a plan view corresponding to FIG. 1A). FIG. 9B is a cross-sectional view corresponding to FIG. 8 (a cross-sectional view taken along line X-X of FIG. 1A). FIG. 9C is a side view corresponding to FIG. 1B.

The molding step is a step (final molding step) of molding the helical structure body 50 into a desired shape as a completed coil 10. In the manufacturing process described above, the respective regions CR for one turn may have their winding centers offset from the axial center SC of helix of the helical structure body 50 as indicated by dashed lines in FIG. 9A. In the molding step, alignment adjustment is performed by deforming (elastically deforming and/or plastically deforming) the respective regions CR for one turn as indicated by arrows so that the centers of the winding of the respective regions CR for one turn coincide with the axial center SC of helix of the helical structure body 50.

Moreover, the respective regions CR for one turn are deformed (elastically deformed and/or plastically deformed) in the helical axis direction to flatten the bent portions B0 (flatten to eliminate the bent portions) (see FIG. 7D). In the case where the bent portions B0 are flattened in the intermediate molding step, flattening of the bent portions B0 in the molding step may be omitted, or the bent portions B0 may be overlapped and flattened into a final shape.

As shown in FIG. 9B, the gap G between each of the regions CR for one turn and the next is altered into a distance g3 which is desired for the coil 10. In the example shown in FIG. 9B, the gaps G between the regions CR for one turn are substantially 0 (g3≈0) (the respective regions CR for one turn (insulating resin 60) are in close contact with one another). However, in the final molding, the helical structure body 50 may be molded so that the gap G of the prescribed distance g3 (>0) is created between each of the regions CR for one turn and the next.

Furthermore, in the case of the coil 10 to be attached to the stator core, for example, the entire shape of the helical structure body 50 may be molded to match the shape of the stator core as necessary. For example, as shown in FIG. 9C, the helical structure body 50 may be molded into a curved shape in which an inner peripheral end portion and an outer peripheral end portion of the helical structure body 50 are not on the same plane so that the helical structure body 50 has a protruding or recessed shape in the axial center SC direction of the helical structure body 50 (radial direction of the stator core). Thus, the coil 10 of the present invention (see FIGS. 1A-1C) is manufactured.

Modified examples of the present embodiment will be described below. FIGS. 10A-10D include flowcharts illustrating process flows of the method for manufacturing a coil according to modified examples of the present embodiment.

Figure 10A:
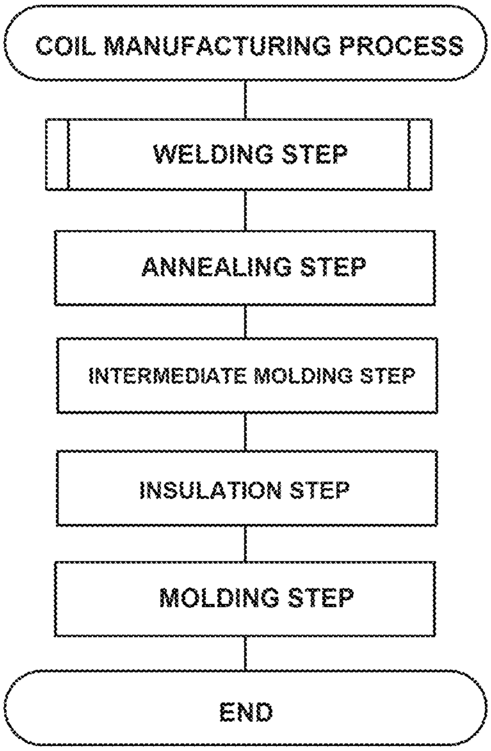
FIGS. 10A-10D include flowcharts for illustrating modified examples of the method for manufacturing a coil according to the present embodiment.

First, the intermediate molding step shown in step S3 in FIG. 3 may be performed after the annealing step (step S5). In other words, the method for manufacturing a coil may be performed in order of the welding step, the annealing step, the intermediate molding step, the insulation step, and the molding step as shown in FIG. 10A. For example, there are cases where there is no need to compress the helical structure body 50 (for the purpose of making effective use of the space in the furnace) before the annealing step, depending on the number of turns and the size of the coil 10, the configuration of the bent portion B0, etc. In these cases, the intermediate molding step may be performed after the annealing step. In the intermediate molding step in that case, the helical structure body 50 is molded (deformed) into the shape suitable for the insulation step.

Figure 10B:
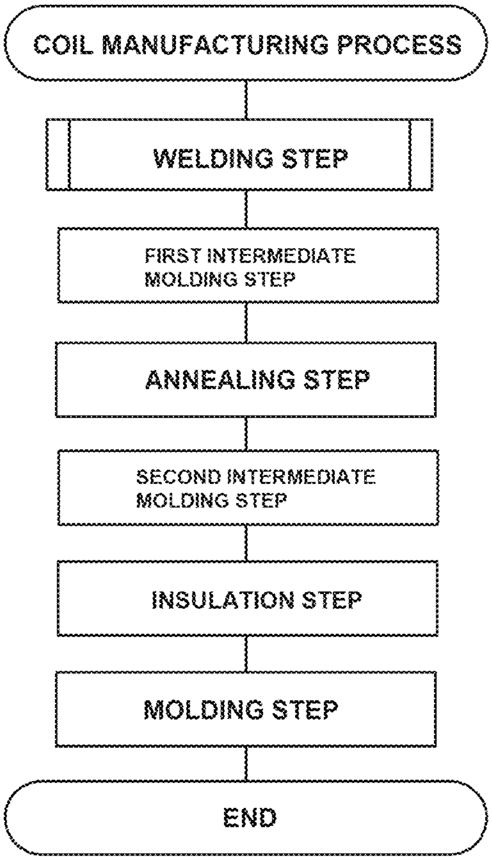

The intermediate molding step may also be performed before and after the annealing step. Specifically, the method for manufacturing a coil may be performed in order of the welding step, a first intermediate molding step, the annealing step, a second intermediate molding step, the insulation step, and the molding step as shown in FIG. 10B. In this case, in the first intermediate molding step, the helical structure body 50 is deformed (for example, the helical structure body 50 is compressed) into the shape suitable for the annealing step, and after the annealing step, the helical structure body 50 is molded (deformed) to the shape suitable for the insulation step.

Figure 10C:
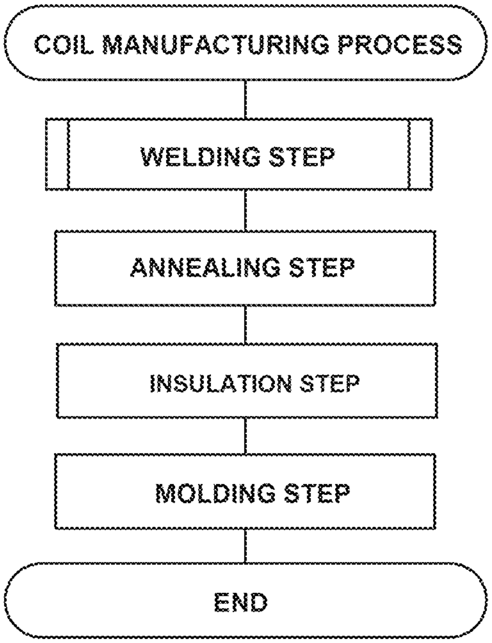

Moreover, the intermediate molding step may be omitted. Specifically, the method for manufacturing a coil may be performed in order of the welding step, the annealing step, the insulation step, and the molding step as shown in FIG. 10C. For example, there are cases where there is no need to compress the helical structure body 50 (for the purpose of making effective use of the space in the furnace) before the annealing step, depending on the number of turns and the size of the coil 10, the configuration of the bent portion B0, etc. Since the helical structure body 50 is softened in the annealing step, and is finally molded (deformed) into a desired shape as the coil 10 in the molding step, the intermediate molding step may be omitted.

Figure 10D:
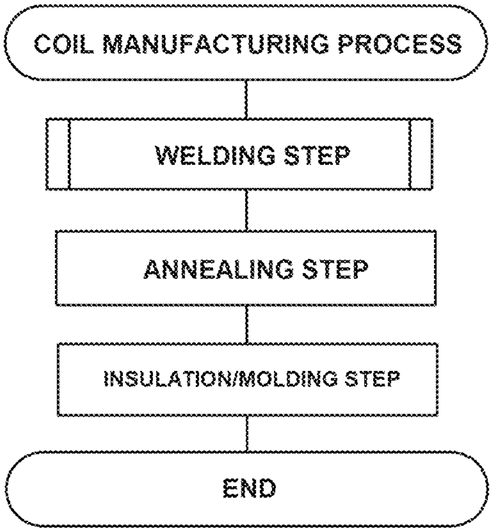

The insulation step may be performed concurrently with the molding step or after the molding step. In other words, the method for manufacturing a coil may be performed in order of the welding step, the annealing step, and an insulation/molding step (an insulation step and a molding step are performed in any order) as shown in FIG. 10D. Depending on methods for application and formation of an insulating resin, the insulation step may preferably be performed concurrently with the molding step or after the molding step.

The insulation step is not limited to coating with an insulating resin as long as the insulation process is performed to insulate the regions CR for one turn from each other. For example, the regions CR for one turn may be insulated by forming an insulating resin layer (injection molded resin layer) around each of the regions CR for one turn by a resin processing method such as injection molding (injection molding or transfer molding). In this case, since the shape of the helical structure body 50 is fixed by the injection molding, the insulation step is performed after the molding step or concurrently with the molding step.

Figure 11:
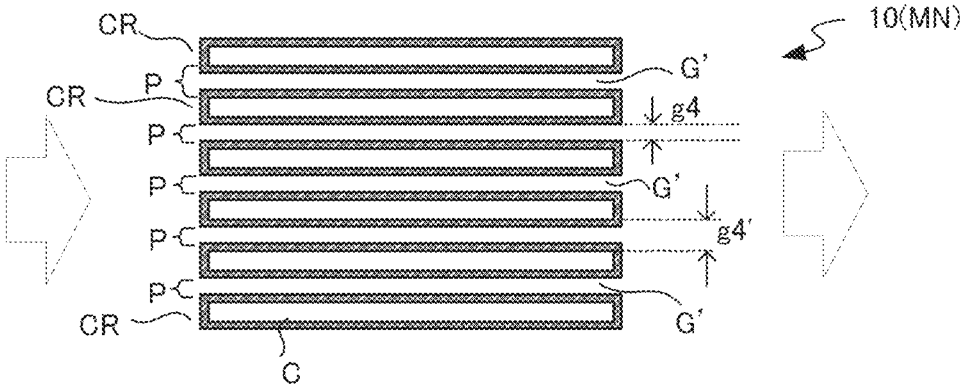
FIG. 11 is a schematic cross-sectional view illustrating a coil according to the present embodiment.

Next, the structure of the coil 10 according to the present invention will be further described. FIG. 11 is a schematic view showing the coil 10 according to the present embodiment, specifically, a schematic cross-sectional view taken along line Y-Y in FIGS. 1A-1C.

FIG. 11 is a cross-sectional view of the coil 10 in a completed state after coating with the insulating resin 60 is performed and final molding is performed as shown in FIG. 9(B), for example. In FIG. 11, only the main portions are shown, and connection portions (terminals) with other members are omitted. In the subsequent drawings, only the main portions of the coil 10 may be shown, and connection portions (terminals) with other members, for example, may be omitted.

FIG. 9B shows, as an example, the configuration in which the gaps G between the regions CR for one turn are substantially 0 (G3≈0). However, the configuration is not limited to this example. The regions CR for one turn and the next in the final shape may intentionally be separated from each other as shown in FIG. 11.

In the present embodiment as described above, in the manufacturing process of the coil 10, the gaps G between the regions CR for one turn may optionally alter appropriately. However, in the final shape after the coil 10 is coated with the insulating resin 60, the coil 10 is molded with the interval P of a given value being ensured as shown in FIG. 11. Specifically, the coil 10 according to the present embodiment is molded so that in the completed state (in the state where the coil 10 is coated with the insulating resin 60) as shown in FIG. 11, a first turn of helix and a second turn, which is continuous to the first turn, in the helical structure body (i.e., between the continuous regions CR for one turn) are separated from each other at the interval P and thereby the hollow gap G is left.

The term "interval P" in the present embodiment refers to a distance that is intentionally set and ensured in advance to fulfill a prescribed function. The distance is maintained without deformation (deformation of the coil in terms of operation and function) even in the final structure of the coil 10 and after shipment (during operation as a product). Similarly, the gaps G of the intervals P in the final shape are intentionally secured to fulfill the prescribed function. The gaps G intentionally ensured as the final shape are hereafter referred to as "gaps G".

More specifically, the term "intervals P" in the present embodiment refer to a distance intentionally set in advance to enhance the heat dissipation performance and/or voltage resistance as an example, and also refers to a distance (see an uppermost interval P) between metal materials (coil pieces C) of the plurality of regions CR for one turn (the coil pieces C) which are connected in a helical axis direction, excluding the resin layers (e.g. the insulating resin 60), or a distance between the resin layers (e.g., the insulating resin 60) provided around the coil pieces C (see second and subsequent intervals P). Here, as an example, the "intervals P" are described as the distance between the resin layers (e.g. the insulating resin 60) provided around the coil pieces C.

In other words, in the coil 10 according to the present embodiment, the portions of the insulating resin 60 of the respective regions CR for one turn are separated from each other at the desired intervals P so that the hollow gaps G' are generated between each of the regions CR for one turn and the next, specifically, between portions of the insulating resin 60 provided around the coil pieces C. In short, it is possible to visually recognize the intentionally secured gaps G' from the appearance of the coil 10 as a finished product. In this example, the intervals P (the distance g4 of the gap G') are (substantially) equal. The phrase "the intervals P are (substantially) equal" means that any difference (in distance set in advance) is not intentionally generated (this applies to the following description). Specifically, the distance g4 is, for example, 0.1 mm to 1 mm, preferably 0.3 mm to 0.8 mm for example, and more preferably 0.5 mm to 0.7 mm, and so on. In the manufacturing process of the coil 10, the coil 10 is molded so as to ensure the interval P of the distance g4 between each of the regions CR for one turn and the next, which are coated with the insulating resin 60 in the molding step (step S9) shown in FIG. 3, the molding step shown in FIGS. 10A-10C, and the insulation/molding step shown in FIG. 10D. The coil pieces C constituting the coil 10 are molded so that the respective regions CR for one turn are molded to ensure the intervals P of prescribed (substantially equal) distance g4' (g4'>g4) in the final shape after molding.

The coil 10 according to the present embodiment is attached to, for example, a stator as a motor component, and is not used as a spring (elastic member). In other words, the intervals P (the distance (that is the distance g4 here) of the gap G') in the present embodiment have homeostasis, and variation (expansion/reduction) of the distance g4 is not expected under normal use conditions (use mode) of the coil 10, and the distance g4 is maintained.

In particular, the coil 10 according to the present embodiment is suitable for, for example, motors serving as a motive power source in electric vehicles and the like. Examples of main cooling structures for motors include a hermetically-sealed cooling structure in which heat dissipation to the outside (natural cooling) is performed through a resin (coating) that is provided around the coil, a medium-enclosed/circulating cooling structure in which a fluid serving as a coolant, such as an oil or water, is enclosed in the coil or the fluid is made to circulate to cool the fluid, and further a forced air-cooled cooling structure that forcedly feeds air to the coil to promote direct heat dissipation. Among them, an appropriate cooling structure is adopted depending on the structure of a motor, the purpose of use, and the like.

Among the above-stated cooling structures, the medium-enclosed/circulating cooling structure or the forced air-cooled cooling structure is desirably configured so that a liquid (such as water or an oil) serving as a coolant or a fluid, such as air, efficiently flows through the entire coil (conductor in helical structure) and comes into contact with the coil.

In the present embodiment, as shown in FIG. 11, in the completed shape of the coil 10 coated with the insulating resin 60, the respective regions CR for one turn (the portions of the insulating resin 60) are separated from each other at the intervals P and therefore the gaps G' are generated. Hence, as compared with the structure in which the regions CR for one turn (the portions of the insulating resin 60) are in close contact with each other, the heat generated inside the coil 10 can efficiently be discharged to the outside. Moreover, even when the coil 10 is adopted for motors having such structure as the medium-enclosed/circulating cooling structure or the forced air-cooled cooling structure, i.e., even when the coil 10 is cooled by a fluid such as air or water in particular, sufficient flow channels of the fluid can be secured between the regions CR for one turn. This makes it possible to smoothly move the fluid, so that the heat dissipation performance can be enhanced and the properties of the coil 10 can be improved. In other words, it can be said that the distance g4 of the gaps G' (the intervals P of the regions CR for one turn) is a distance that enables the cooling fluid to easily pass through. The distance g4 of the gaps G' is set to a distance that is smaller than at least one of the distance g1 and the distance g2, and larger than the distance g3. Specifically, in the manufacturing process of the coil 10, the gaps G are gradually reduced to the distance g1 and the distance g2, and the coil 10 is fixed to the shape having the intended gaps G' at the prescribed intervals P (distance g4) in the final shape. However, without being limited thereto, the distance g4 of the gap G' may be identical to or different from at least one of the distance g1 and the distance g2.

In the case of the coil configured by the method such as winding a conductive member (conductive wire) made of a conventional round wire or square wire (the periphery of the round wire and the square wire are each coated with an insulating resin), gaps between the turns of the conductive wire are expanded by increasing the diameter of the conductive wire, so that the flow channel of the fluid can be secured, although a space factor is disadvantageously lowered. In addition, it is very difficult to accurately control the distance of the gap.

In the case of the coil configured by the method such as winding a litz wire formed as a bundle of conventionally known fine wires (the periphery of which is coated with an insulating resin), the space factor can be improved by bundling the fine wires. However, heat is easily contained inside the litz wire (between the fine wires). Moreover, since gaps are generated between the litz wires and inside the litz wires, the (size and position of) flow channel of the fluid becomes random, which causes a problem of insufficient cooling. Furthermore, it is very difficult to accurately control the gaps between fine wires and between the litz wires, as is the case of the coil formed by winding the round wire or the square wire.

On the other hand, the coil 10 according to the present embodiment (FIG. 11) has a helical structure by connecting coil pieces C that are formed into any shape by punching. Therefore, it is possible to form both the inner peripheral side and the outer peripheral side of the regions CR for one turn into a rectangular shape along the outer shape of (the teeth of) a stator core, for example. Therefore, the space factor can be improved. In addition, since the gaps G' can be formed along the turns of the helical structure (for each of the regions CR for one turn), the heat dissipation area can be increased as compared with conventional coils, and heat dissipation efficiency can be enhanced. In addition, the distance g4 of the gap G' can appropriately be set for the finished shape in the final molding process, for example. Therefore, the gaps G' can easily be controlled. In other words, it becomes possible to make the formation positions or shapes of the gaps G' substantially equal (uniform) (it is also possible to form the gaps G' as slits arranged at equal intervals). This makes it possible to design a balance point between heat dissipation performance (efficient heat dissipation) and the space factor.

The example shown in FIG. 11 indicates the case where a plurality of intervals P (the distance g4 of the gap G') in one coil 10 are substantially equal. However, the distance g4 of the gap G' does not need to be exactly equal (identical) distance as long as the coolant can flow through the gaps G'. For example, the intervals P (the distance of the gap G') in one coil 10 may be different in distance between the regions CR for one turn so that the intervals P are gradually widened/narrowed along the helical axis direction, so long as the intervals P are intentionally secured and maintained after completion as the final structure of the coil 10.

FIGS. 12A-12H, 13A-13D, 14A-14C, and 15A-15G show other examples of the coil 10 in which the intervals P are secured for the respective regions CR for one turn. In these examples, the coil 10 includes spacers 11 for maintaining (securing) homeostasis of the intervals P.

FIGS. 12A-12H include diagrams showing a first example of the spacer 11, in which FIGS. 12A-12D show the coil 10 in the completed state. Although a detailed description in FIGS. 12A-12H is omitted, the periphery of the coil pieces C (the helical structure body 50) is coated with an insulating resin 60.

Figure 12A:
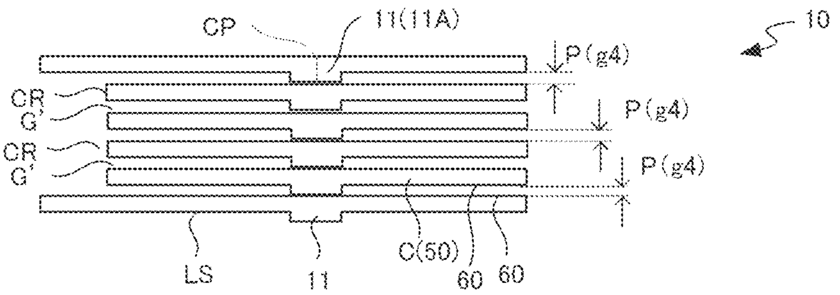

FIG. 12A shows a schematic side view of the coil 10 as viewed from the longer side LS. The spacers 11 (11A) are formed by using, for example, part of the coil pieces C during manufacturing process of the coil 10. Specifically, in a deburring step (step S14) in the welding step shown in FIG. 5, for example, part of the burrs 55 is left, instead of the burrs 55 being removed until they become flat, so that the burrs 55 protrude from the surface (wider surface WS) of the coil pieces C (so as to form a protruding shape) to serve as the spacers 11A. In the deburring step (step S14), the burrs 55 are removed by broaching, for example. However, the amount of removal can optionally be selected. Therefore, by controlling the amount of removal of the burrs 55 in the deburring step, the spacers 11A of a desired shape (protrusion amount) can be formed. In other words, in this case, the deburring step in the method for manufacturing the coil in the above-stated embodiment includes a spacer formation step. The spacers 11A allow the respective regions CR for one turn to secure the prescribed intervals P and to form gaps G' of a certain distance (for example, distance g4) on part of the regions CR for one turn (portions other than the spacers 11A). The spacers 11A portions may be in close contact with or separated from corresponding upper and lower regions CR for one turn (insulating resin 60). When the spacer 11A portions are also separated, the fluid can move more smoothly. However, even when the spacers 11A portions are in contact with the upper and lower regions CR for one turn, the gaps G' are still secured in other regions. Therefore, as compared with the conventional coils, the fluid can move further more smoothly. In the case of the configuration where the spacers 11A are provided as shown in FIG. 12A, the distance of the gap G' may be any distance as long as the fluid can pass therethrough. In other words, the distance of the gap G' may be, for example, the distance g4 in the range shown in FIG. 11, or may be larger or smaller than the distance g4.

According to the configuration, the spacers 11A can reliably maintain the gaps G' (interval P), and form the gaps G' at least in part of the respective regions CR for one turn. As a result, the flow channel of the fluid serving as a coolant can be secured, so that the heat dissipation performance can be enhanced. Moreover, the heat dissipation performance can also be enhanced when the spacer 11A portions are configured to be separated from each other. Since the spacers 11A can be formed (with an appropriate amount of removal of the burrs 55) during the manufacturing process of the coil 10, heat dissipation structure can be achieved easily at low cost.

Figure 12B:
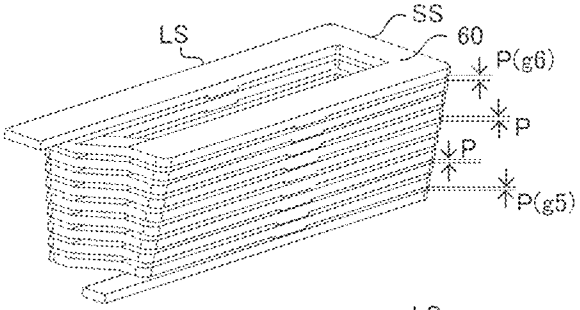
Figure 12C:
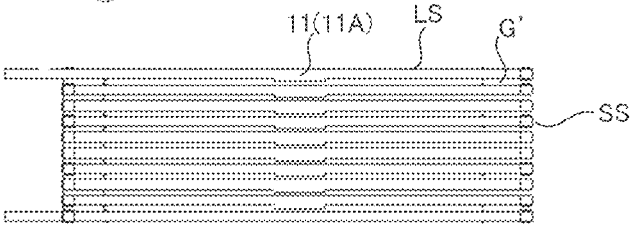
Figure 12D:
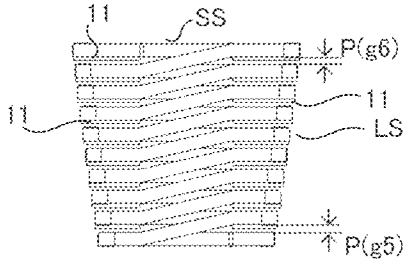

FIGS. 12B-12D are diagrams showing the configuration of a desirable coil 10 in the case of being attached to the stator in particular. FIG. 12B is a perspective view of the coil, FIG. 12C is a side view thereof as viewed from a direction of the longer side LS, and FIG. 12D is a side view thereof as viewed from a direction of the shorter side SS.

In the coil 10, the shape of the coil pieces C constituting each of the regions CR for one turn can be selected optionally (as appropriate) by punching. Therefore, it is desirable to configure the coil 10 as the final structure so that the inner peripheral side of the helical structure has a rectangular parallelepiped shape and the outer peripheral side has a substantially square truncated conical shape along the shape of (the teeth of) the stator core to which the coil 10 is attached (FIGS. 12B and 12D).

In such a configuration, the intervals P (distance g4 of the gap G') of the respective regions CR for one turn may be varied for each turn or for each of a plurality of turns. Specifically, when, for example, the coil 10 is used for (the stator of) an inner rotor type motor, the intervals P of the regions CR for one turn, in the vicinity of a rotor (a magnet, see FIGS. 16A-16E) which easily generates heat (in the vicinity of the lower side in FIGS. 12 and 12D where the shorter side SS is shorter (narrower)), may be made different from the other intervals P. As an example, a distance g5 of the gap G in a region, other than the region of the spacers 11A proximate to the rotor (on inner peripheral side) may be made smaller (for example, 0.3 mm), and a distance g6 of the gaps G' farthest to the rotor (outer peripheral side) may be made larger than the distance g5 (for example, 1 mm). In this case, these gaps G' (plurality gaps G' which include the gaps G' which the gap G' of the distance g5 and the gaps G' of the distance g6) may have a distance progressively (evenly) increasing toward an outer peripheral direction for each turn, may have a distance gradually increasing for each of a plurality of turns, or may have a distance equal to a value between the distance g5 and the distance g6 (for example, 0.5 mm or the like).

In examples shown in FIGS. 12A-12H, although the spacers 11 are provided on the longer side LS, the spacers 11 may be provided on the shorter side SS, or may be provided on both the longer side LS and the shorter side SS.

In the present embodiment, the protrusion amount of the spacers 11A can optionally (appropriately) be controlled by adjusting the removal amount of the burrs 55 in one coil 10 (the spacers 11A of a necessary protrusion amount can be formed at a necessary location: the protrusion amount may be different for each of the regions CR for one turn). Therefore, it is easy to control the intervals P (the gaps G') between the respective regions CR for one turn. In other words, it is possible to easily control the heat dissipation performance at low cost according to the state of heat generation.

In the above examples, the case of forming the spacers 11A using the burrs 55 is illustrated. This means that the spacers 11A each have a welded portion CP (which is not visually recognized) formed at a substantially center portion (see FIG. 12A) in the helical traveling direction by pressing. However, the method for forming the spacers 11A is not limited to this.

Figure 12E:
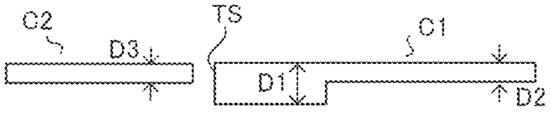
Figure 12F:
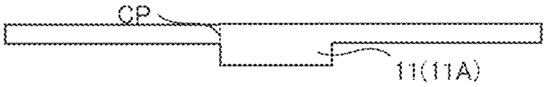

FIGS. 12E-12H are schematic side views showing the vicinity of the spacer 11A extracted to show other examples of the method for forming the spacer 11A. For example, as shown in the FIG. 12E, a coil piece C1 may have a thickness that is larger only in an end portion including an end surface TS (the end portion has a thickness D1 and other portions have a thickness D2), and the coil piece C1 may be welded to a coil pieces C2 having a uniform thickness (a thickness D3) (the coil pieces C different in thickness are connected) to form a spacer 11A as shown in FIG. 12F. In this case, the welded portion CP may not be located at a substantially-center portion of the spacers 11A in the helical traveling direction. Note that the thickness D2 and the thickness D3 may be identical to or different from each other.

Figure 12G:
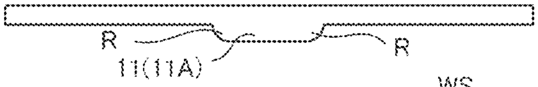

As shown in the FIG. 12G, the spacer 11A may have corner portions which have protruded during formation of the spacer 11A (in the deburring step), and the corner portions may be chamfered to form a curved part R. In this way, coating properties of the insulating resin 60 at the corner portions of the spacers 11A can be enhanced.

Figure 12H:
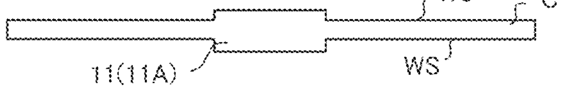

Furthermore, the spacers 11A are not limited to the configuration of protruding toward one surface (wider surface WS) of the coil pieces C, and may be configured to protrude toward both the surfaces (both surfaces) of the coil pieces C, as shown in FIG. 12H. Since the burrs 55 are generated on both the surfaces of the coil pieces C (see, for example, FIG. 6D), the burrs 55 may be removed so that the spacers 11A protrude toward both the surfaces (the burrs 55 are partially left).

The configurations of the spacers 11A shown in FIGS. 12A-12H can be combined as appropriate. For example, in FIG. 12H, the curved part R may be provided as shown in FIG. 12G, and the spacer 11A in FIG. 12G may be formed by welding as shown in FIGS. 12E and 12F.

Figure 13A:
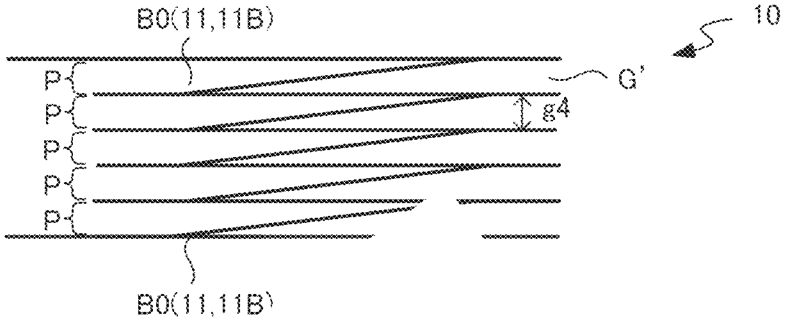
Figure 13B:
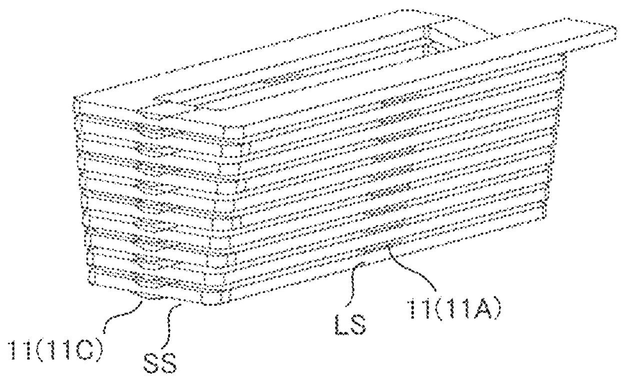
Figure 13C:
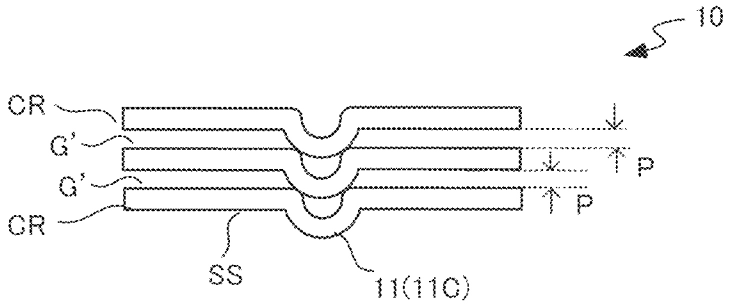
Figure 13D:
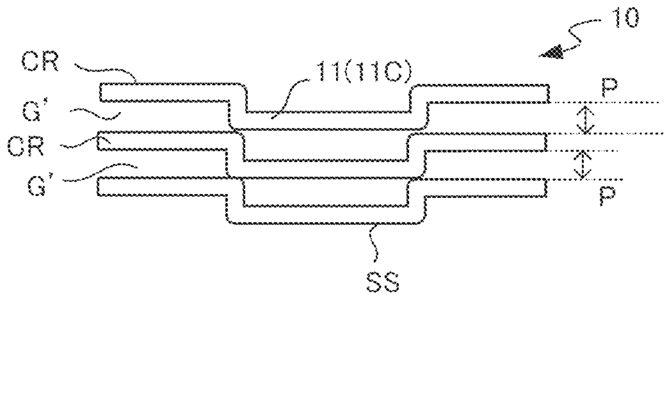

FIGS. 13A-13D include diagrams showing other examples of the spacers 11, in which the spacers 11 (11B, 11C) are formed by bending the coil pieces C. FIG. 13A is a side view of the coil 10 in the completed state (after being coated with the insulating resin 60) as viewed from the longer side LS direction, and FIGS. 13B-13D are schematic views showing other examples of the spacers 11. FIGS. 13A-13D each show the coil 10 in the completed state, and the periphery of the coil pieces C (the helical structure body 50) is coated with the insulating resin 60, although a detailed description thereof is omitted.

As shown in FIG. 13A, the bent portions B0 (see FIGS. 6B and 7A-7C) are left without being completely flattened during the intermediate molding step (e.g., step S3 in FIG. 3) and the molding step (step S9) in the manufacturing process of the coil 10 (the bent portions B0 are used as they are or the bent portions B0 are deformed (molded)), so as to use the bent portions B0 as the spacers 11B to secure desired intervals P (gaps G') between the respective regions CR for one turn. In this case, the distance of the gap G' may be any distance as long as the fluid can pass therethrough (the distance may be equivalent to the distance g4, for example).

In one coil 10, the intervals P (the distance of the gap G') may be varied (gradually become wider/narrower along the helical axis direction). Specifically, in this case, the formation step of the spacers 11B is included in at least one of the bending step in the welding step (step S12 shown in FIG. 5), the intermediate molding step (for example, step S3 shown in FIG. 3) and the molding step (step S9 in FIG. 3), or the molding step (step S9 shown in FIG. 3) in the method for manufacturing the coil in the above-mentioned embodiment. In the present embodiment, a plurality of manufacturing processes can be applied as shown in FIGS. 3 and 10A-10D In any case, it is preferable for the spacers 11B to be formed after the annealing step, that is, it is preferable that the intervals P (gaps G') be secured.

FIGS. 13B-13D are examples in which the spacers 11 (11C) are formed by bending the coil pieces C. The spacers 11 (11C) are formed separately from the bent portions B0 so as to avoid interference with a pressure welding apparatus. In this case, the bent portions B0 may be formed (left), or the bent portions B0 may not be formed (not left). For example, in the intermediate molding step (e.g., step S3 shown in FIG. 3) or the molding step (step S9), the respective regions CR for one turn are bent into the same shape (so as to protrude in one direction, for example) at the same (corresponding, opposing, overlapping) positions (part of the shorter side SS in FIG. 13B) to form the spacers 11C. The spacers 11C allow the portions of the insulating resin 60 of the respective regions CR for one turn to be separated at the prescribed interval P and to form the gaps G' of a certain distance in portions other than the spacers 11C. In this example, the spacer 11C portions may be in close contact with or separated from corresponding upper and lower regions CR for one turn (the insulating resin 60). In this case, the distance of the gap G' may be any distance such as the distance g4 in the range shown in FIG. 11, or may be larger or smaller than the distance g4. The formation step of the spacers 11C in this case is included in the intermediate molding step (for example, step S3 shown in FIG. 3) or the formation step (step S9). However, the spacers 11C may be formed in a step different from these steps. In the present embodiment, a plurality of manufacturing processes can be applied as shown in FIGS. 3 and 10A-10D. In any case, it is more preferable that the spacers 11C are formed after the annealing step.

The spacers 11C formed by bending may have a curved shape as shown in FIGS. 13B and 13C, or may be a step (stair) shape as shown in FIG. 13D. In the examples shown in FIGS. 13A-13D, the spacers 11C are provided on the shorter side SS, although the spacers 11C may be provided on the longer side LS.

In the examples shown in FIGS. 13A-13D, the spacers 11A are provided on the longer side LS. However, the spacers 11A may be omitted. A plurality of types of spacers 11 (11A, 11B, 11C) may coexist in one coil 10. In this case, at least one type of the plurality of types of spacers 11 (11A, 11B, 11C) may be provided in the region CR for one turn, or each turn may be provided with the spacer 11 of a different type.

The protruding spacers 11 (11A) shown in FIGS. 12A-12H and/or the spacers 11 (11B, 11C) formed by bending shown in FIGS. 12A-12H and 13A-13D are preferably provided for each region CR for one turn in the helical structure body 50. However, the region CR for one turn may be omitted in the first turn or the final turn. The spacers 11 may not be provided for each region CR for one turn, and there may be one or more regions CR for one turn not provided with the spacer 11 in one or more turn (even in the middle) of the helical structure body 50.

For example, in the coil 10 having a substantially square truncated conical-shaped appearance, the spacers 11 (11A to 11C) are illustrated as the spacers 11 that protrude to the side (lower side illustrated in FIGS. 12D and 13B) where the length of the shorter side SS is shorter (narrower). However, the spacers 11 may protrude in any direction, and may protrude upward in FIGS. 12D and 13B. The formation position of the spacer 11 does not need to be identical for each region CR for one turn. For example, the turn where the spacer 11 is provided on the longer side LS and the turn where the spacer 11 is provided on the shorter side SS may coexist.

The protruding (bending) direction of the spacers 11 in one coil 10 is not limited to the identical direction, and there may be the spacers 11 which protrude (are bent) in different directions (so as to face each other in the continuous regions CR for one turn).

Figure 14A:
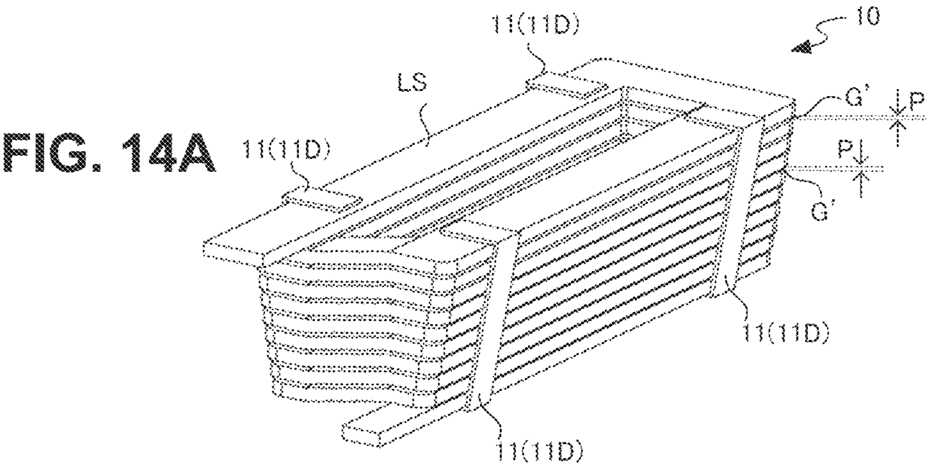
FIG. 14A is an external perspective view showing the coil according to the present embodiment.
Figure 14B:
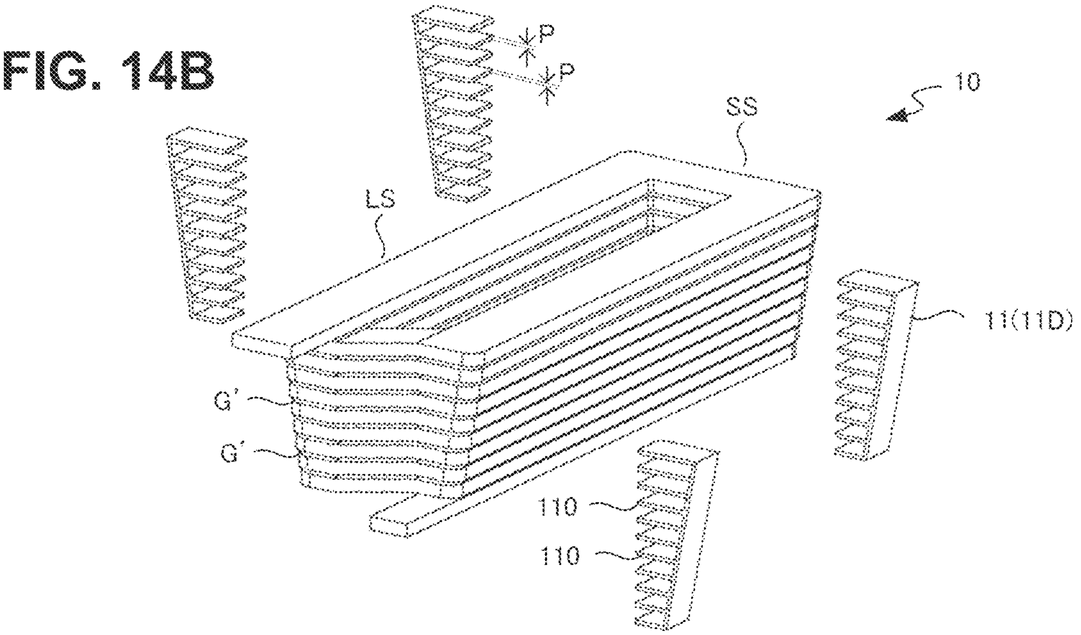
FIG. 14B is an external perspective view showing the coil and the spacers.
Figure 14C:
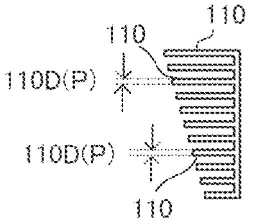
FIG. 14C is a side view of the spacer.

FIGS. 14A-14C include drawings showing other embodiments of the spacers 11, in which FIGS. 14A and 14B show the coil 10 in the completed state, and the periphery of the coil pieces C (the helical structure body 50) is coated with the insulating resin 60, although a detailed description thereof is omitted. FIGS. 14A and 14B are external perspective views, and FIG. 14C is a side view showing examples of the spacers 11. FIGS. 12A-12H and 13A-13D show examples where a part of the coil 10 functions as the spacers 11. However, without being limited thereto, the spacers 11 (11D) may be other components other than the coil 10 (coil pieces C) (a separate member from the coil 10 (coil pieces C)), as shown in FIGS. 14A-C. For example, as shown FIGS. 14B and 14C the spacers 11D are separate components each having a plurality of comb teeth 110 and attachable to and detachable from the coil 10. For example, during the molding step (step S9 in FIG. 3), the spacers 11D are inserted to the helical structure body 50 which is coated with the insulating resin 60 (not illustrated) so as to support (hold) the respective regions CR for one turn between the comb teeth 110, and are molded so as to compress the distance between each of the regions CR for one turn and the next. In this case, a thickness 110D of each of the comb teeth 110 of the spacer 11D corresponds to the interval P. In other words, when the spacers 11D are attached to the coil 10 and molded so as to restrain further compression, the regions CR for one turn (the portions of the insulating resin 60) are separated at the prescribed intervals P and the gaps G' of a given distance is formed between the regions CR for one turn.

The spacers 11D in this example are configured so that the length of the comb teeth 110 is different (becomes progressively shorter (longer)) along the axial direction of the coil 10 as shown in FIG. 14C, in accordance with the coil 10 having a substantially square truncated conical shape. However, the length and shape of the comb teeth 110 are not limited to this example, and are appropriately set in accordance with the shape of coil 10. The length of the comb teeth 110 may all be the same length.

The spacers 11D may also be included in part of the coil 10. In other words, the coil 10 may be shipped with the spacers 11D attached thereto. When the coil 10 is attached to another member (for example, a stator), the spacers 11D may be detached, or the coil 10 may be attached to another member without the spacers 11D being detached.

In this case, the distance of the gap G' may be any distance such as the distance g4 in the range shown in FIG. 11, or may be larger or smaller than the distance g4. The thickness 110D (intervals P) of the comb teeth 110 may be an identical size (length) or may be different in size (may be varied along the helical axis direction).

The spacers 11D can be configured so as to be attached to at least one location of each of the regions CR for one turn. However, it is more desirable that each spacer 11D be provided in the vicinity of four corner portions TN of each of the regions CR for one turn as shown in FIGS. 14A and 14B, because unintended dispersion of the gaps G' in the circumferential direction is suppressed.

The spacers 11 in the present embodiment may be a combination of at least one or more spacers described above. Specifically, the spacers 11A shown in FIGS. 12A-12H may be combined with the spacers 11B (11C) formed by bending shown in FIGS. 13A-13D, or the spacers 11B (11C) formed by bending shown in FIGS. 13A-13D may be combined with the spacers 11D independent of the coil 10 shown in FIGS. 14A-14C.

Figures 15A, 15B, 15C, 15D, 15E, 15F, 15G:
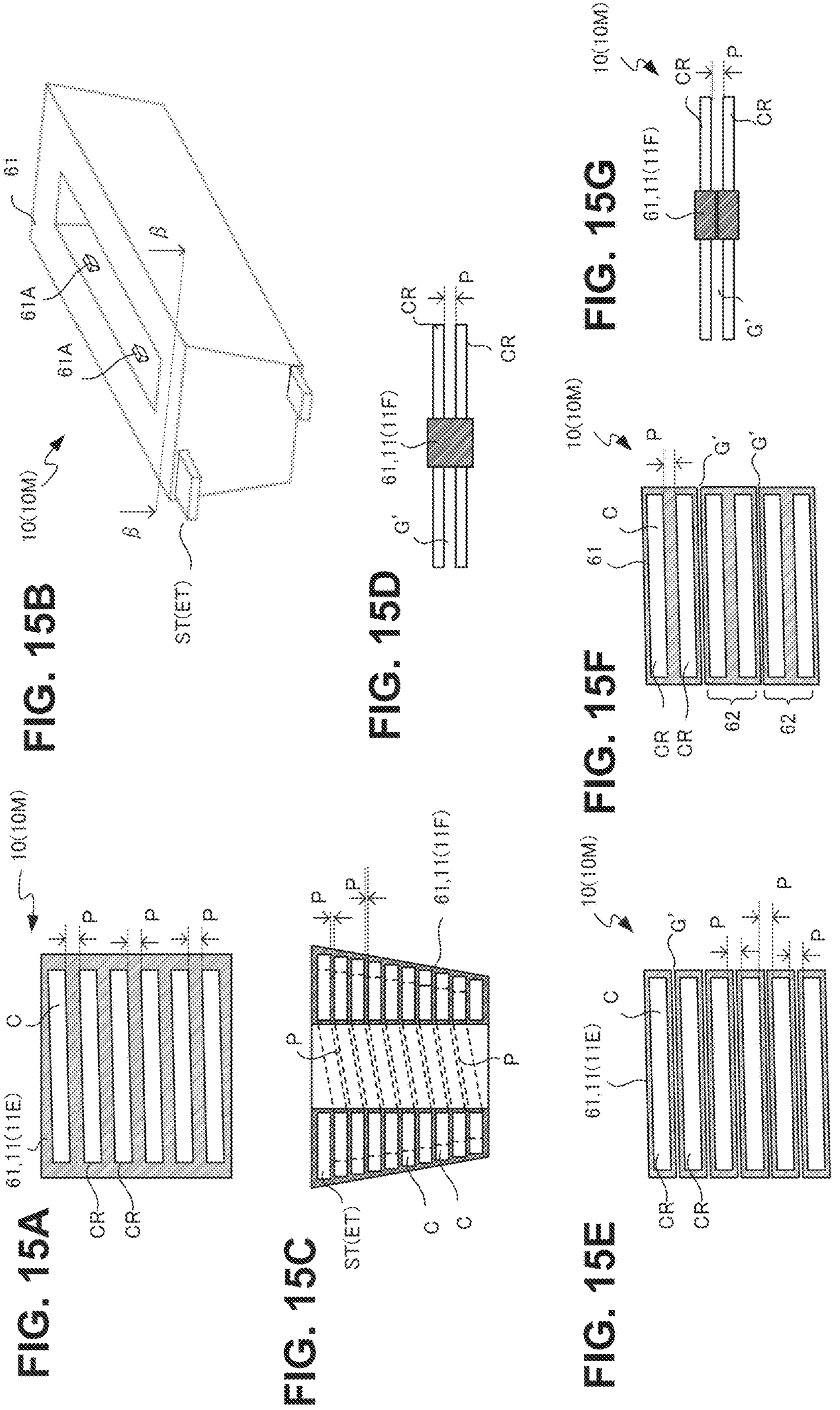

FIGS. 15A-15G include diagrams showing other forms of the coil 10 according to the present embodiment. FIGS. 15A-15G include schematic views of the coil 10 in the completed state, in which FIG. 15A is a cross-sectional view corresponding to a cross section taken along line X-X in FIGS. 1A-1C. FIG. 15B is an external perspective view of the coil 10, which is the coil 10 same as that in FIG. 15A, having an appearance formed into a substantially square truncated conical shape. FIG. 15C is a cross-sectional view taken along line β-β of FIG. 15B. FIG. 15D is a side view showing extracted part of the region CR for one turn.

The coil 10 may be configured so that each turn of the helical structure body 50 is covered with an injection-molded resin, as shown in FIGS. 15A-15G.

As described above, the coil 10 according to the present embodiment may have the insulating resin layer (injection-molded resin layer) 61 formed around each of the regions CR for one turn (coil piece C) by a resin processing method, such as injection (mold) molding (for example, injection molding or transfer molding) in the insulation step. The injection-molded resin is, for example, an engineering plastic with high thermal conductivity and/or high electrostatic breakdown voltage. Specifically, in the embodiment shown in FIGS. 15A-15G, the coil pieces C (metal materials) of the respective regions CR for one turn are separated by the injection-molded resin layer 61 at the prescribed intervals P. The intervals P are the thickness of the injection-molded resin layer 61 provided around the coil pieces C. In this case, it can be said that the injection-molded resin layer 61 is the spacer 11 (11E). The injection-molded resin layer 61 can be configured to maintain the coil pieces C (metal material) of the respective regions CR for one turn at the intended intervals P, and the values of the intervals P may be any values (selectable as appropriate).

In the cooling structure of the motor described before, when the sealed cooling structure that dissipates heat to the outside through resin is adopted, an injection-molded resin with a high thermoelectric coefficient is used as the injection-molded resin layer 61. Since the periphery of the coil pieces C constituting the coil 10 is covered with the injection-molded resin layer 61, the heat dissipation performance of the coil 10 can be enhanced. In addition, using injection-molded resin materials with high electrostatic breakdown voltage can enhance the voltage resistance.

For example, after the coil 10 is molded into a desired final shape in the molding step, the injection-molded resin layer 61 is formed around each of the regions CR for one turn by injection molding. Alternatively, while the coil 10 is molded into a desired final shape in the molding step, the injection-molded resin layer 61 is formed around each of the regions CR for one turn by injection molding.

A specific description will be given with reference to FIGS. 15B and 15C. For example, as shown in FIGS. 9A and 9B, alignment adjustment of the helical structure body 50 and deformation of the helical structure body 50 in the helical axis direction are performed during the molding step. In the deformation in the helical axis direction, the prescribed intervals P (the distance of the gap G') are secured to prevent close contact between the coil pieces C corresponding to the respective regions CR for one turn (see FIG. 15C). In this state, the helical structure body 50 is set in a resin-molding mold (not illustrated). The resin-molding mold has a shape that covers the entire helical structure body 50 except for the end portions (one end ST and the other end ET) of the helical structure body 50. An injection-molded resin material is then injected and sealed in the resin-molding mold and cured (injection-molded or transfer-molded).

As a result, as shown in FIGS. 15B and 15C, the entire helical structure body 50 except for the end portions (one end ST and the other end ET) of the helical structure body 50 is covered with the injection-molded resin layer 61. In addition, the injection-molded resin layer 61 is continuously provided around each of the regions CR for one turn in the helical traveling direction, so that the coil pieces C constituting the respective regions CR for one turn are separated at the prescribed intervals P. The values of the intervals P (>0) can be set to any value. The injection-molded resin layer 61 serves as a spacer 11E that maintains the intervals P between each of the regions CR for one turn and the next (coil pieces C), which ensures that the intervals P in the completed state are secured and maintained.

In this way, in the case of providing the injection-molded resin layer 61, the insulation step is performed after the molding step (see FIG. 10D). When injection holes are generated in the injection-molded resin layer 61, the injection-molded resin layer 61 may be completely sealed by double molding.

As shown in FIG. 15B, optional components 61A may be formed integrally with the injection-molded resin layer 61 with a resin-molding mold. For example, the components 61A are engagement portions to engage with other members (for example, a stator).

For example, the injection-molded resin layer 61 may also be formed by setting each of the regions CR for one turn into the resin-molding mold in a state where each of the regions CR for one turn and the next are separated at the prescribed intervals P by the spacer members (for example, the members similar to the spacers 11D having the comb teeth 110 as shown in FIG. 14B).

Alternatively, a resin-molding mold having spacer members (for example, the members similar to the spacers 11D having the comb teeth 110 as shown in FIG. 14B) provided therein may be used. In this case, the mold used in the molding step for alignment adjustment/deformation in the helical axis direction may also be used as the resin-molding mold. In other words, after the helical structure body 50 is set in the resin-molding mold including the spacer members (not illustrated), and the alignment adjustment/deformation in the helical axis direction are performed, an injection-molded resin material is injected and sealed in the resin-molding mold, and all the regions CR for one turn are integrally cured (injection-molded or transfer-molded). In this case, the insulation step is also performed after the molding step (see FIG. 10D). However, the molding step and the insulation step can be performed continuously with the same mold.

As shown in FIG. 15D, an injection-molded resin layer 61 may be provided to partially cover the plurality of regions CR for one turn in the circumferential direction and to integrally fix the regions CR for one turn while maintaining the intervals P. In this example, only the regions CR corresponding to two turns are extracted and shown. However, the injection-molded resin layer 61 integrally fix all the regions CR for one turn.

As shown in FIG. 15E, the injection-molded resin layer 61 may be configured to cover each of the regions CR for one turn independently of each other. The injection-molded resin layer 61 secures the intervals P. In addition, as shown in FIG. 15F, the injection-molded resin layer 61 may integrally fix the plurality of (for example, two) regions CR for one turn while maintaining the intervals P to constitute helical groups 62. In this case, one coil 10 includes a plurality of helical groups 62, which are integrated with each other through injection-molded resin layers 61 different from each other. In these cases, the gaps G' may be formed between the injection-molded resin layers 61, or the injection-molded resin layers 61 may be in close contact with (close proximity to) each other.

As shown in FIG. 15G, the injection-molded resin layer 61 may be provided for each turn to partially cover the regions CR for one turn in the circumferential direction. The respective regions CR for one turn have the intervals P maintained and the gaps G' secured by the injection-molded resin layers 61. The injection-molded resin layers 61 may be separated or in close contact (in close proximity) with each other.

In addition, although illustration is omitted, the injection-molded resin layer 61 may be used to form the protruding spacer 11 (11F) as shown in FIGS. 12A-12H. Specifically, as shown in FIGS. 15D, for example, all the regions CR for one turn may be covered with the injection-molded resin layer 61 partially in the circumferential direction and integrally in all the turns. The protruding spacer 11 (11F) made of the injection-molded resin layer 61 may also be provided in the regions CR for one turn partially in the circumferential direction and for each turn (see FIG. 15G).

In the case of the injection-molded resin layer 61 (spacer 11F) partially provided in the circumferential direction as shown in FIGS. 15D and 15G, the injection-molded resin layer 61 may be provided on any one of the longer side LS and the shorter side SS, or may be provided on both the longer side LS and the shorter side SS. The formation position of the injection-molded resin layer 61 does not need to be identical for each region CR for one turn. For example, the turn where the injection-molded resin layer 61 is provided on the longer side LS and the turn where the injection-molded resin layer 61 is provided on the shorter side SS may coexist.

In this way, in all the cases shown in FIGS. 15A-15G, the injection-molded resin layers 61 (the spacers 11E, 11F) maintain the regions CR for one turn (metal materials) at the prescribed intervals P.

A heat conduction means (cooling means, heat dissipation means) may be provided on the surface of the injection-molded resin layers 61 or between the facing (overlapping) injection-molded resin layers 61.

In the case of coating the periphery of the helical structure body 50 with an insulating resin, an attention is required for handling in terms of controlling the uniformity of the film thickness and maintaining the state of the thin film (preventing the occurrence of scratches) during a coating work in the insulation step or during shipment as a product. However, providing (molding) the injection-molded resin layers 61 eliminates the need to control the thickness of the film and also facilitates the handling of the coil 10 (the work in the insulation step and work in subsequent shipping), so that packaging can also be simplified. In addition, it is also possible to reduce costs relating to the coating work in the case of resin coating and to subsequent product handling.

As shown in FIGS. 15A-15G, in the configuration where the injection-molded resin layer 61 is provided around the each of the regions CR for one turn in the helical structure body 50, the helical structure body 50 may be formed by winding a conventionally known round wire (square wire), a litz wire or a flat conductor.

As described in the foregoing, the coil 10 according to the present embodiment has a structure in which the respective regions CR for one turn are intentionally separated at the prescribed intervals P in a finished product state. The coil 10 includes the coil 10 (which is hereinafter referred to as a molded coil 10M) formed of the helical structure body 50 that is (at least partially) covered with the injection-molded resin layer 61 shown in FIGS. 15A-15G, and other coils (which may hereafter be referred to as "non-molded coil 10NM" for convenience).

Specifically, the non-molded coil 10NM is the coil 10 described with reference to the drawings such as FIGS. 11, 12A-12H, 13A-13D, and 14A-14C. The non-molded coil 10NM is the coil 10 in which the helical structure body 50 formed by connecting the coil pieces C is coated with the insulating resin 60 (without injection molding). In the external appearance of the non-molded coil 10NM in a completed shape, the prescribed intervals P are secured for the respective regions CR for one turn, and hollow gaps G' are provided between the portions of the insulating resin 60 of the respective regions CR for one turn in a visually recognizable manner. The non-molded coil 10NM may have the spacers 11 for securing the intervals P between the portions of the insulating resin 60 of the respective regions CR for one turn and the resulting hollow gaps G'.

The molded coil 10M is the coil 10 in which at least part of the helical structure body 50 formed by connecting the coil pieces C is covered with the injection-molded resin layer 61, and the prescribed intervals P are secured for each of the regions CR for one turn (coil piece C, metal material). In the molded coil 10M (FIGS. 15A-15C) in which the entire helical structure body 50 is integrally covered and fixed with the injection-molded resin layer 61, the prescribed interval P is secured for each of the regions CR for one turn (coil pieces C, metal materials), although there is no gap G'. In this case, the intervals P between each of the regions CR for one turn (coil piece C) and the next are maintained and fixed by the injection-molded resin layer 61. In other words, in this case, the injection-molded resin layer 61 is said to be the spacer 11 to maintain the intervals P.

However, without being limited to the above-described configuration, the coil 10 may have the configuration as shown in FIGS. 15D-15G, in which at least part of the helical structure body 50 is covered with the injection-molded resin layer 61 to secure the intervals P between the regions CR for one turn, and the gaps G' are formed between the coil pieces C of the respective regions CR for one turn or between the injection-molded resin layers 61.

Moreover, the distance of the interval P and/or the gap G' may be in the range of 0.05 mm to 10 mm, for example.

Figure 16A:
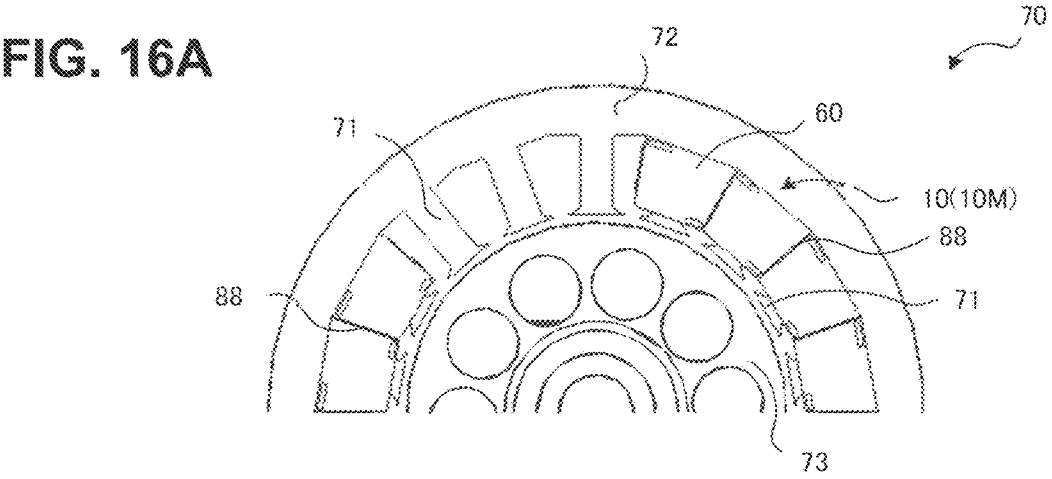

Next, a stator 70 according to the present embodiment will be described with reference to FIGS. 16A-16E. FIGS. 16A-16E include plan views showing part of the stator 70 according to the present embodiment, the part of the stator being extracted as viewed from a rotation axis direction of a motor. In FIG. 16A, part of the coil 10 is omitted for the sake of description. Here, the illustrated stator 70 is a component of an inner rotor type motor. However, a stator that is a component of an outer rotor type motor can also be implemented in a similar manner, and similar effects can be achieved.

As shown in FIG. 16A, the stator 70 according to the present embodiment includes the coil 10, and an annular stator member 72 having teeth 71 arranged in an annular shape. Here, the coil 10 is illustrated as the molded coil 10M having the helical structure body 50 that is integrally covered with the injection-molded resin layer 61 as shown in FIGS. 15B and 15C. However, the coil 10 may be other molded coils 10M shown in FIGS. 15A-15G or may be another coil 10 (non-molded coil 10NM). The molded coil 10M is directly attached to each of the plurality of teeth 71.

Figure 16B:
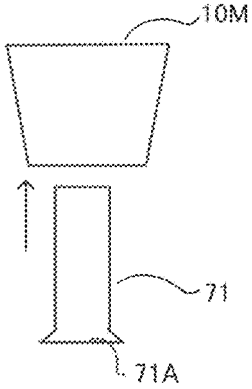
Figure 16C:
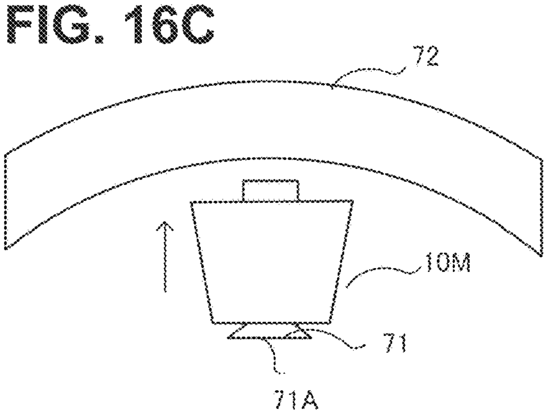

An example of the method for attaching the molded coil 10M is as follows. As shown in FIGS. 16B and 16C, the teeth 71 are configured to be attachable to and detachable from the inner peripheral surface of the stator member 72 by an engagement (fitting) means which is not illustrated, for example. The teeth 71 are inserted into the inside (axial core portions) of the molded coils 10M (FIG. 16B), and fixed to the stator member 72 (FIG. 16C). The teeth 71 each include, for example, a bobbin-like flange 71A on one side of an axial core direction of the molded coil 10M, which prevents detachment of the molded coil 10M from each of the teeth 71. Each of the teeth 71 is not limited to the shape shown in FIG. 16B. For example, the teeth 71 may each be configured into the shape of a cassette which can be disengaged/engaged along the helical axis direction of the molded coil 10M. The teeth 71 may each be inserted into the inside of the molded coil 10M from both the sides of the molded coil 10M in the helical axis direction (in an up-down direction in FIG. 16B). By engaging two cassettes with each other with the molded coils 10M held therein, the molded coils 10M are attached to the teeth 71 as shown in FIG. 16C.

In any case, the molded coils 10M are directly engaged with the teeth 71, without through separate components (fixing means) or the like. It is also possible to eliminate the necessity of insulating materials (insulators) that have traditionally been provided between coils and teeth.

Thus, in the present embodiment, since the number of components such as insulating members and fixing members is reduced, the cost of the stator 70 can be lowered, and an assembly work of the molded coils 10M is significantly simplified, resulting in a simplified manufacturing process and an enhanced production efficiency.

Figure 16D:
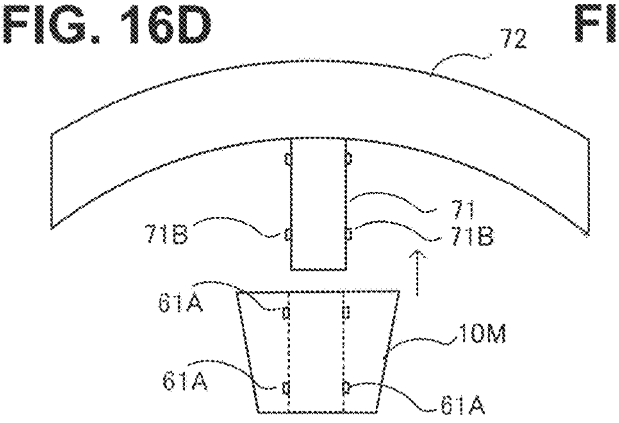
Figure 16E:
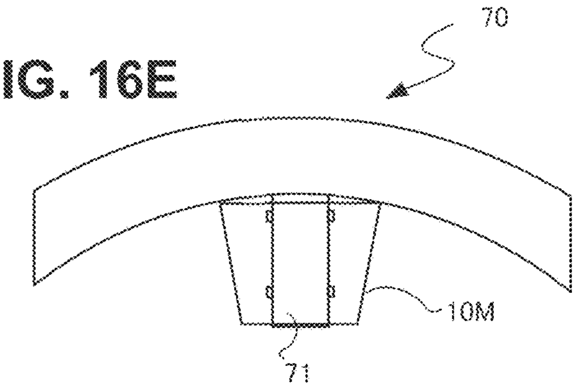

Alternatively, as shown in FIGS. 16D and 16E, the molded coil 10M may be configured so that the injection-molded resin layer 61 has engagement portions 61A (see FIG. 16C) formed for fixing to the teeth 71 and/or the stator member 72, for example. The teeth 71 and/or the stator member 72 may have corresponding engagement (receiving) portions 71B. In this case, the flange 71A is not needed for each of the teeth 71, and the teeth 71 can be fixed to the stator member 72 (so as not to be detached). In other words, the necessity of the means for attaching the teeth 71 and the stator member 72 is also eliminated.

By inserting the molded coils 10M into the teeth 71 which is fixed to the stator member 72, the engagement portions 61A and the engagement (receiving) portions 71B engage (fit) with each other, so that the molded coils 10M are attached (FIG. 16E). As a result, the number of components is further reduced from that in the configuration shown in FIG. 16B, and attaching operation is further facilitated.

In the molded coils 10M which are adjacent to each other in an annular shape, the injection-molded resin layers 61 are in proximity to or in close contact with each other. In each of the coils 10, the injection-molded resin layer 61 is also in proximity to or in close contact with the stator member 72 which surrounds the outer periphery of the injection-molded resin layer 61. This makes it possible to arrange the molded coils 10M inside the stator 70 without waste and to bring a rotor (magnet) 73 shown by a dashed line in proximity to the coils 10 by eliminating excess space. As a result, the performance as a motor can be enhanced. In addition, the size and weight of the stator can be reduced as compared with conventional stators having equivalent properties. In addition, a high-power stator can be implemented by increasing the number of coils as compared with conventional stators having equivalent sizes.

As shown in FIG. 16A, a thin heat conduction means (a cooling means, a heat dissipation means) 88, or the like, may be attached between the injection-molded resin layers 61 of the molded coils 10M that are adjacent in an annular shape. For example, the heat conduction means 88 is preferably a flat heat pipe or a vapor chamber.

Figure 17A:
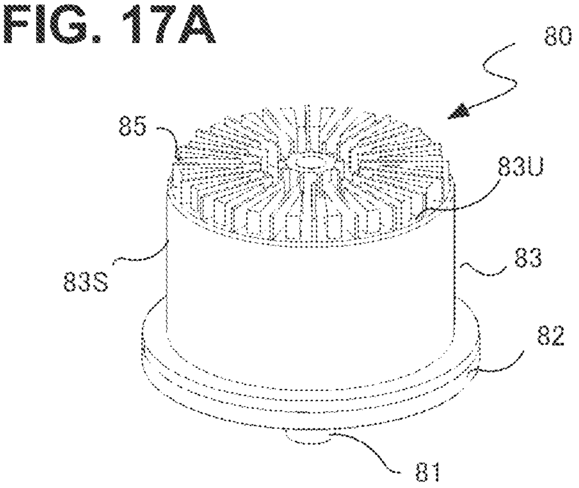
Figure 17B:
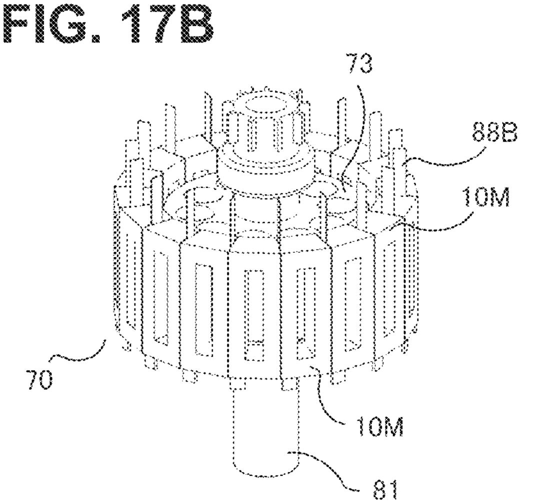
Figure 17C:
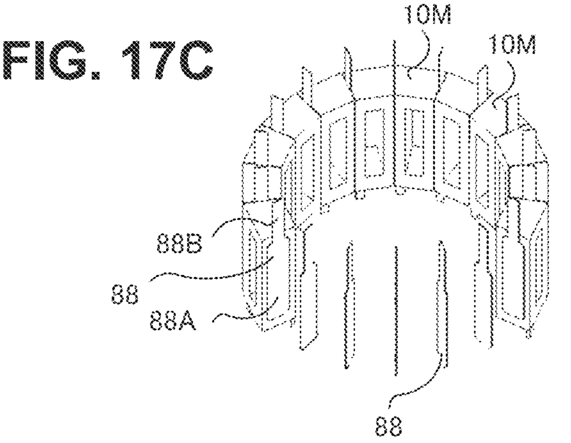
Figure 17D:
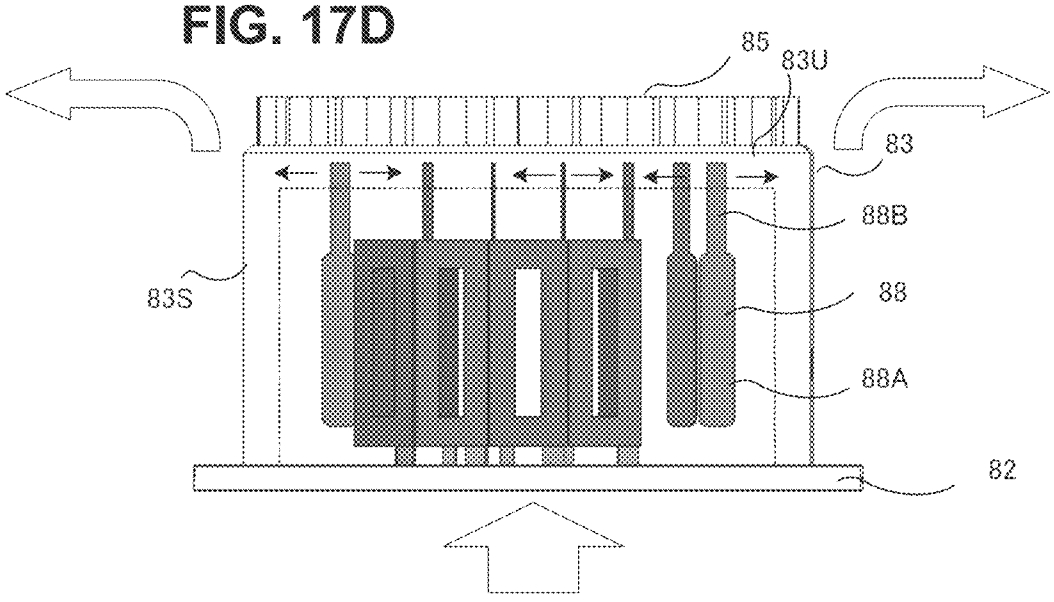

Next, a motor 80 according to the present embodiment will be described with reference to FIGS. 17A-17D. FIGS. 17A-17D include diagrams showing the motor 80 according to the present embodiment. FIG. 17A is an external perspective view of the motor 80, and FIGS. 17B and 17C are perspective views thereof with some parts omitted. FIG. 17D is a perspective side view thereof showing part of the inside of the motor 80 in a perspective manner. Here, the motor 80 is illustrated as a motor of an inner rotor type, in which the rotor 73 is arranged on the inside (inner peripheral side) of the stator 70. An outer rotor type motor, in which the rotor 73 is arranged on the outside (outer peripheral side) of the stator 70, can also be implemented in a similar manner, and similar effects can be achieved.

As shown in FIGS. 17A-17C, the motor (single-phase motor, three-phase motor, etc.) 80 includes, for example, a shaft 81, the rotor 73, the stator 70 (see FIGS. 16A-16E), and a casing (housing) 83. These components are assembled so that the rotor 73 can rotate relative to the stator 70. The shaft 81 is a columnar member, which rotates around its central axis while being supported by a bearing (not illustrated), for example. One end of the shaft 81 is coupled to a device to be driven (not illustrated) via a power transmission mechanism such as a gear.

The rotor 73 has magnets arranged in its circumferential direction and rotates together with the shaft 81. The stator 70 is arranged, for example, on the radial outside of the rotor 73, and generates power to rotate the rotor 73 by the coils 10M arranged in the circumferential direction. The stator 70 has an external terminal connected to a drive circuit or a power supply (both of which are not illustrated) which supplies electric power to the motor via a lead wire, for example. As shown in FIG. 17A, the casing (housing) 83 has a substantially cylindrical shape for integrally covering the stator 70 and the rotor 73, with fins 85 being provided on the outside (outer surface) of one surface (top surface) of the casing 83U. The fins 85 are a plurality of blade-like members provided radially around the shaft 81, that is, at equal intervals in a circumferential direction of the top surface 83U of the casing 83. In this example, a case where the fins 85 are provided integrally with the casing 83 is shown. However, the fins 85 may be independent of the casing 83. The casing 83 is fixed to a base 82 which is fixed to the shaft 81 so as to rotate together with the shaft 81.

The motor 80 provides a drive current to the coils 10 (here, the molded coils 10M, and this applies to the following description) from the power supply or the drive circuit via a bus bar (not illustrated. This generates a magnetic flux in (the teeth 71 of) the stator 70. Then, due to the action of the magnetic flux between the teeth 71 and the magnets, a torque in the circumferential direction is generated. As a result, the rotor 73 and the casing 83 rotate around the axis of the shaft 81 relative to the stator 70.

The plurality of molded coils 10M are attached to the stator 70 in this example as shown in FIGS. 17B-17D. Between each of the annularly arranged molded coils 10M, a flat-plate heat pipe (or a vapor chamber) is provided as the heat conduction means (cooling means, heat dissipation means) 88. The heat conduction means 88 each include a body portion 88A and a lead-out portion 88B. The body portion 88A is inserted, by being pasted or the like, between the injection-molded resin layers 61 of the molded coils 10M, and the lead-out portion 88B is embedded into (the inside of the member) of the top surface 83U of the casing 83 so as to be in contact/touch (connected) with the molded coils 10M (FIG. 17D).

With such configuration, as shown by black arrows in FIG. 17D, the heat generated in the molded coils 10M is conducted to the casing 83 via the heat conduction means 88 and dissipated to the outside. The rotation of the casing 83 also rotates the fins 85, which creates flows of air as shown by hollow arrows in FIG. 17D, so that the inside of the casing 83 can be cooled.

Thus, the present embodiment can enhance the heat dissipation performance of the coils 10 (molded coils 10M). In the case of the molded coils 10M, the heat dissipation performance and/or the voltage resistance can be enhanced by selecting materials of the injection-molded resin. Therefore, it is possible to enhance the heat dissipation performance and/or pressure resistance, and enhances the properties as the motor 80.

In the stator 70, the number of components such as insulating members and fixing members can be reduced, and cost reduction in the motor 80 can be achieved. In addition, an assembly work is significantly simplified due to, for example, the adoption of the molded coils 10M, resulting in a simplified manufacturing process and an enhanced production efficiency. In addition, the size and weight of the motor can be reduced as compared with conventional motors having equivalent properties. In addition, a high-power motor can be achieved by increasing the number of coils as compared with conventional motors having equivalent sizes.

The coils attached to the stator member 72 are not limited to the molded coils 10M, and other coils 10 according to the present embodiment may also be used.

For example, in the case of the non-molded coils 10NM as shown in FIG. 11 and other drawings, the flow channel of the fluid can sufficiently be secured in the medium-enclosed/circulating cooling structure or the forced air-cooled cooling structure as compared with the conventional coils. The present embodiment can provide the motor 80 that is compact, light-weight, and better in heat dissipation performance than conventional motors in terms of forced air-cooled cooling. By reducing the number of components, component costs and manufacturing costs can be reduced, and furthermore the risk of detachment, or the like, of the components can be minimized. Therefore, the motor 80 suitably used for drones which are currently under development can be provided.

Figure 18A:
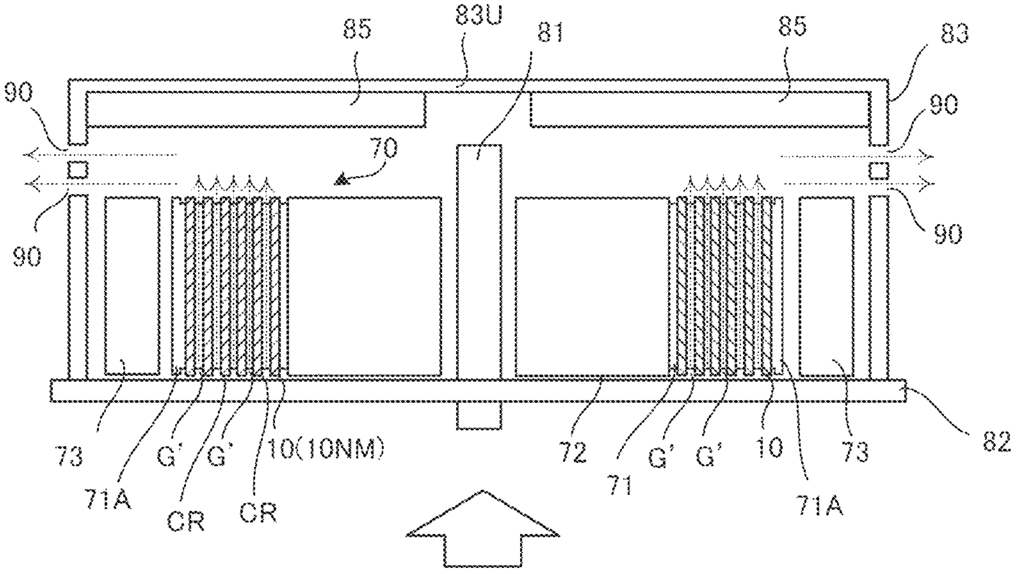
Figure 18B:
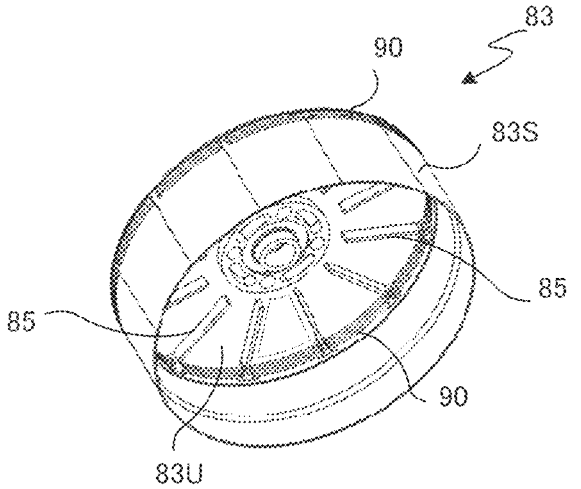

With reference to FIGS. 18A and 18B, other embodiments of the motor 80 according to the present embodiment will be described. FIGS. 18A and 18B include schematic views of the motor 80 in another embodiment. FIG. 18A is a schematic cross-sectional view of the motor 80 taken along the axial direction of the shaft 81. FIG. 18B is a perspective view of the casing (housing) 83 as viewed from the bottom. The motor 80 shown in FIGS. 18A and 18B is, as an example, a motor with the medium-enclosed/circulating cooling structure or the forced air-cooled cooling structure forced air-cooled motor. The motor 80 is also an outer rotor type motor. Specifically, the stator 70 is arranged around the shaft 81, and the rotor 73 is arranged on the radial outside as shown in FIG. 18A. The rotor 73 has magnets arranged in its circumferential direction and rotates together with the shaft 81.

The stator 70 has a configuration corresponding to an outer rotor type rotor, based on the configuration of the stator 70 of the present embodiment described with reference to drawings, such as FIGS. 16A-16E, and the coil 10 according to the present embodiment is attached thereto. In the example shown in FIGS. 16A-16E, the coils 10 are non-molded coils 10NM shown in the drawings such as FIG. 11. Specifically, the teeth 71 are inserted into the inside (axial core portions) of the non-molded coils 10NM, and fixed to the stator member 72. The flanges 71A prevent detachment of the non-molded coils 10NM from the teeth 71. The method for attaching the non-molded coils 10NM to the stator member 72 is similar to the method described above (FIGS. 16A-16E).

As shown in FIG. 18B, the casing 83 in this example is similar in configuration to the motor 80 shown in FIGS. 17A-17D in that the casing 83 has a substantially cylindrical shape that integrally covers the stator 70 and the rotor 73, except that the fins 85 are provided on the inside (back side) of the top surface 83U. On a side surface (side wall) 83S in the vicinity of the top surface 83U of the casing 83, a plurality of opening portions 90 are provided. The opening portions 90 are, for example, slits provided along the circumferential direction of the side surface 83S. In this case, the top surface 83U is not open, and therefore when the base 82 is covered with the casing 83, the substantial opening portions 90 are only portions in the casing 83 that communicate with the outside (see FIG. 18A). Since other configuration aspects are similar to those of the motor 80 shown in FIGS. 17A-17D, a description thereof is omitted.

As shown in FIG. 18A, the non-molded coils 10NM have gaps G' maintained by the spacers, so that sufficient flow channel of fluid (e.g. air) can be secured between the regions CR for one turn of the coils 10 (non-molded coils 10NM).

In the case of the medium-enclosed/circulating cooling structure or the forced air-cooled cooling structure in particular, as the motor 80 rotates, that is, as the rotor 73 and the casing 83 rotates, air is sucked (swirled) into the casing 83 as shown by a hollow arrow in FIG. 18B from the lower side in the drawing. In the configuration of the present embodiment, the sucked air passes between the regions CR for one turn of the coils 10 (the gaps G') as shown by dashed arrows in FIG. 18B and rises. The air is then discharged to the outside from the opening portions 90 on the upper side of the casing 83 due to centrifugal force. In this case, the fins 85 provided radially inside the top surface 83U can further promote air discharge to the outside.

In other words, with the configuration, it is possible to form a flow of air (flow channel) coming from the lower side (the base 82) of the motor 80 (casing 83), passing the regions CR for one turn of the coils 10, and going out from the opening portions 90 on the upper side of the casing 83. Since it is possible to cause the flow of air to touch all the regions CR for one turn of the coils 10 and to move smoothly, the heat generated in the coils 10 can efficiently be discharged to the outside. Therefore, the heat dissipation performance of the coils 10 and also the motor 80 can be enhanced, and the properties thereof can be enhanced.

The present embodiment can provide the motor 80 that is compact, light-weight, and better in heat dissipation performance than conventional motors. Moreover, separate cooling structure and the like are not needed, component costs and manufacturing costs can be reduced by reduction in the number of components, and furthermore the risk of detachment, or the like, of the components can be minimized. Therefore, the motor 80 suitably used for drones which are currently under development can be provided.

In addition, the coils 10 may be molded coils 10M. In this case, it is desirable to select a material with high heat dissipation performance as the material for injection-molded resin. As in the case of the motor 80 shown in FIGS. 17A-17D, the heat conduction means 88 may be provided.

As shown by the dashed lines in FIG. 18B, opening portions may be provided in part of the top surface 83U (between the fins 85 in this example).

The fins 85 may be provided outside the top surface 83U shown in FIGS. 17A-17D. The slits of the opening portions 90 on the side surface 83S may be provided in the direction along the axial direction of the shaft 81, and may be provided in a dot (round hole) shape or a mesh shape. The opening portions 90 may not be provided. The opening portions 90 may also be provided on the casing 83 of the motor 80 shown in FIGS. 17A-17D.

Although the case of the outer rotor type rotor is illustrated in FIGS. 17A-17D, an inner rotor type rotor can also be implemented in a similar manner. In this case, similar effects can be achieved.

In the present embodiment described in the foregoing, the intervals P of the regions CR for one turn of the coils 10 (the molded coils 10M and the non-molded coils 10NM, and this applies to the following description) may all be a (substantially) equal distance if the distance is intentionally preset value, or may vary (so as to be progressively wider or narrower in the helical axis direction, for example).

According to the present embodiment, coil pieces C having a substantially rectangular corner portion TN are formed by punching or the like, and the coil pieces C are then continuously joined and pressure-welded to form a coil 10. In short, the substantially rectangular corner portions TN of the coil pieces C constitute corner portions of the coil 10. Therefore, the present embodiment makes it possible to manufacture the coil 10 in which corner portions on the inner peripheral side and the outer peripheral side of the regions CR for one turn are formed into a substantially rectangular shape. In the past, a long flat conductor has been wound to manufacture a coil made of a flat conductor. In the coil formed by winding, it is inevitable that at least the corner portion on the inner peripheral side of the coil is formed into a curved shape, which hinders enhancement in space factor, enhancement in heat dissipation performance, and the like when the coils are attached to a stator 70.

However, according to the present embodiment, the space factor in the case where the coils are attached to the stator 70 can be enhanced, and also the heat dissipation performance can be enhanced by elimination of excessive space.

Particularly, the welded portion CP between the coil pieces C is provided in a linear portion other than the corner portion TN (corner portion). In short, pressure welding is performed by using the linear portion of the coil pieces. As a result, the precision of the shape of the corner portion TN can be enhanced. For example, the original shape of a corner portion, which is formed to be in a rectangular (substantially rectangular) shape through punching process, can be maintained as it is.

In the pressure welding step, a large load is applied to pressure welding between the end faces TS of the coil pieces C. However, through the annealing step and the subsequent molding step, the coil 10 free from unnecessary strain and residual stress can be provided.

In addition, after the helical structure body 50 with a required number of turns is formed as the coil 10 as a finished product, the insulation step is performed (insulation process is performed) while a necessary and sufficient gap G' between each of the regions CR for one turn and the next is maintained. This makes it possible to reliably and evenly insulate each of the regions CR for one turn even in the corner portions (to form a coating of the insulating resin 60 or to attach an injection molded resin layer 61), and to thereby achieve high voltage resistance.

As described above, the present invention is not limited to the above-described embodiments, and may be configured in various embodiments.

For example, in the above-described embodiment, the cases where the coil pieces C are U-shaped have been described as examples. However, the coil pieces C may be in other shapes as shown in FIGS. 2A-2G.

In the above-described embodiment, the configuration has been described in which the coil pieces C are deformed one by one at a time (the bent portion B0 is formed) in the bending step before welding, and then the coil pieces C are pressure-welded in the pressure welding step. However, without being limited thereto, the present invention may be configured such that all the coil pieces C corresponding to a necessary number of turns are all deformed (to form the bent portions B0) in advance, and then the deformed coil pieces C are used to perform pressure welding in the pressure welding step.

In the present embodiment, examples have been described in which whenever one welded portion CP is formed in the pressure welding step, the burrs 55 are removed from the welded portion CP in the deburring step, and the welded coil piece is pressure-welded to a next coil piece C. However, the present invention is not limited to the examples. In the helical structure body 50 scheduled to be completed, a plurality of (or all) welded portions CP are formed, and then a plurality of burrs 55 generated in the respective welded portions CP may be removed. In this case, after an Nth pressure welding step, a plurality of (N) burrs 55 may collectively be removed (as a unit) in one deburring step, or after the Nth pressure welding step, the deburring step may be performed a plurality of number of times (e.g., two to N times or more) to remove the plurality of (N) burrs 55.

One coil piece C is not limited to one configured by a punching process of a copper plate. The coil piece C may also be formed by parallel arrangement of a plurality of thin flat conductors (for example, flat conductors having a square-shaped cross section (cross section corresponding to FIGS. 2B and 2C) orthogonal to the strip longitudinal direction BL) in a strip transverse direction BS of the helical structure body 50 (in a direction orthogonal to the helical traveling direction).

In addition, the coil pieces C are not limited to those configured by the punching processing. The coil pieces C may be those obtained by deforming round wires (round conductors) into flat conductors by pressing, for example.

The plurality of coil pieces C may have widths which are different from each other in the strip transverse direction BS (which are gradually larger (or smaller)) along the helical traveling direction. In this case, the coil pieces C may have thicknesses (thicknesses in the axial direction of helix) which are different according to the widths of the coil pieces C in the strip transverse direction BS so that the cross-sectional areas, orthogonal to the helical traveling direction, at any positions in the helical traveling direction (for example, cross-sectional areas corresponding to FIG. 2B) are equal to each other. The coil 10 formed in this manner has an outline shape of a truncated four-sided pyramid, as shown in FIG. 1B.

The thickness D and/or the width (length of the wider surface WS) of the regions CR for one turn in the coils 10 may be varied for each turn or for each of a plurality of turns. In other words, the helical structure body 50 may be configured to have a larger thickness D as the width becomes smaller in the helical traveling direction by connecting the plurality of coil pieces C that have a larger thickness D as the width is smaller.

In the case of the coils 10 where the gaps G' are formed, the distance of the gap G' (e.g. the distance g) may be varied (expanded or reduced) along the helical traveling direction. In the case of the coils 10 where the thickness D varies along the helical traveling direction, the distance of the gap G' may increase or decrease depending on the thickness D. Even in the case of the coils 10 where the thickness D does not vary, the distance of the gap G' may increase or decrease.

Furthermore, two coil pieces C to be pressure-welded to each other may be different in the shape of their end faces TS. For example, the coil pieces C to be pressure-welded may be configured to be different in width (length in the strip transverse direction BS) as the shape of their end faces TS, the coil pieces C may be configured to be different in thickness (length between the wider surfaces WS), or the coil pieces C may be configured to be different in width and thickness.

The plurality of coil pieces C may also be constituted of flat conductors and round wires. In other words, a coil piece C constituted of a flat conductor and a coil piece C constituted of a round wire may be configured to be pressure-welded to each other.

In addition, some or all of the corner portions TN of the coil pieces C may be substantially rectangular on the inner peripheral side and may have a curved part on the outer peripheral side. Some or all of the corner portions TN of the coil pieces C may also have a curved part on at least part of the inner peripheral side.

The present invention can be applied to a case where coils (flat rectangular coil, edgewise coil) are manufactured using flat conductors.

REFERENCE SIGNS LIST

10 coil
10M molded coil
10NM non-molded coil
11, 11A, 11B, 11C, 11D, 11E, 11F spacer
50 helical structure
50' virtual helical structure body
55 burr
60 insulating resin
61 insulating resin layer (injection molded resin layer)
70 stator
71 teeth
72 stator member
73 rotor
80 motor
81 shaft
82 base
83 casing (housing)
83S side surface
83U top surface
85 fin
88 heat conduction means (heat dissipation means)
88A body portion
88B lead-out portion
90 opening portion
110 comb teeth
C flat conductor (coil piece)
CC welded coil piece
CR region for one turn
CR' virtual region for one turn
G gap
P interval
LS longer side
SS shorter side
g distance

The invention claimed is:

1. A coil comprising a helical structure body made of strip-shaped flat conductors that are continuously joined into a helical form, wherein in the helical structure body in a completed state, a first turn of helix is separated from a second turn, which is continuous to the first turn, at an interval preset to fulfill a prescribed function by a spacer, wherein a hollow gap is secured between the first turn and the second turn; and the spacer is constituted of at least a first portion of the flat conductor located on the first turn and is insulated from the opposing second turn, the first portion of the flat conductor has a first length in a helical traveling direction, and the flat conductor has a second portion without the spacer having a second length in the helical traveling direction greater than the first length of the first portion.

2. The coil of claim 1, wherein the spacer is constituted of deforming the flat conductor.

3. The coil of claim 1, wherein the spacer is constituted of bending the flat conductor at least in a direction different from the helical traveling direction.

4. The coil of claim 1, wherein helical structure body is constituted of pressure welding end faces of the flat conductors to each other, and the spacer is a part of a burr generated by the pressing.

5. The coil of claim 4, wherein the spacer is a resin layer.

6. The coil of claim 5, wherein the resin layer is provided on at least a part of a surface of the first turn and at least a part of a surface of the second turn.

7. The coil of claim 1, wherein:

a distance of the hollow gap is about 0.1 mm to 1 mm.

8. The coil of claim 1, wherein a fluid is allowed to pass between the first turn and the second turn.

9. The coil of claim 1, wherein at least an inner peripheral corner portion of the helical structure body is in a non-curved shape.

10. The coil of claim 1, wherein each turn of the helical structure body is covered with an injection-molded resin.

11. The coil of claim 10, wherein the respective turns are integrally covered with the injection-molded resin.

12. A stator comprising:

the coil of claim 10; and a stator member having teeth arranged in an annular shape, wherein the coil is directly attached to each of the teeth.

13. The stator of claim 12, wherein a heat conduction means is arranged between the coils adjacent to each other in an annular shape.

14. A motor comprising the stator of claim 12.

15. The motor of claim 14, comprising a casing in a substantially cylindrical shape, the casing having a top surface and a side surface, wherein the casing has a blade-like member provided on the top surface, and an opening portion provided in part of the side surface.

* * * * *